United States Patent
Lee et al.

(10) Patent No.: US 11,983,360 B2
(45) Date of Patent: May 14, 2024

(54) TOUCH SENSOR AND A DISPLAY DEVICE INCLUDING THE SAME

(71) Applicant: SAMSUNG DISPLAY CO., LTD., Yongin-si (KR)

(72) Inventors: Choon Hyop Lee, Yongin-si (KR); Jang Hui Kim, Yongin-si (KR); Jae Won Kim, Yongin-si (KR); In Nam Lee, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 119 days.

(21) Appl. No.: 17/708,188

(22) Filed: Mar. 30, 2022

(65) Prior Publication Data
US 2022/0326831 A1 Oct. 13, 2022

(30) Foreign Application Priority Data
Apr. 13, 2021 (KR) .................. 10-2021-0048082

(51) Int. Cl.
*G06F 3/041* (2006.01)
*G06F 3/044* (2006.01)
*G09G 3/32* (2016.01)

(52) U.S. Cl.
CPC ........ *G06F 3/04166* (2019.05); *G06F 3/0418* (2013.01); *G06F 3/0446* (2019.05); *G09G 3/32* (2013.01)

(58) Field of Classification Search
CPC .. G06F 3/04166; G06F 3/0418; G06F 3/0446; G09G 3/32
See application file for complete search history.

(56) References Cited

U.S. PATENT DOCUMENTS

| | | | |
|---|---|---|---|
| 8,766,931 B2 | 7/2014 | Westhues et al. | |
| 8,791,907 B2* | 7/2014 | Wu | G06F 3/04166 345/173 |
| 10,310,670 B2* | 6/2019 | Cheng | G06F 3/04166 |
| 10,481,724 B2 | 11/2019 | Choi | |
| 11,086,446 B2* | 8/2021 | Jiang | G06F 3/04182 |
| 2011/0042152 A1* | 2/2011 | Wu | G06F 3/04166 345/173 |
| 2016/0041645 A1* | 2/2016 | Ray | G06F 3/0445 345/174 |
| 2017/0285795 A1* | 10/2017 | Tanemura | G06F 3/0446 |

(Continued)

FOREIGN PATENT DOCUMENTS

| | | |
|---|---|---|
| KR | 10-1863160 | 6/2018 |
| KR | 10-2018-0103400 | 9/2018 |
| KR | 10-2022-0023878 | 3/2022 |

*Primary Examiner* — Michael Pervan
(74) *Attorney, Agent, or Firm* — F. Chau & Associates, LLC

(57) ABSTRACT

A touch sensor including: a touch sensing area including driving electrodes and sensing electrodes; a driving signal generator which determines phases of driving signals based on a reference code and supplies the driving signals to the sensing electrodes, wherein the driving signals are sine waves; and a touch processor which receives sensing signals according to the driving signals from the sensing electrodes and determines a touch position based on the sensing signals and the reference code, wherein the driving signal generator controls the phases of the driving signals by updating the reference code at a predetermined time point.

23 Claims, 22 Drawing Sheets

(56) References Cited

U.S. PATENT DOCUMENTS

| | | |
|---|---|---|
| 2018/0011599 A1* | 1/2018 | Cheng .................. G06F 3/0446 |
| 2020/0264754 A1* | 8/2020 | Jiang .................. G06F 3/04166 |
| 2022/0057898 A1 | 2/2022 | Lee et al. |
| 2022/0155937 A1* | 5/2022 | Jo ....................... G09G 3/3225 |

* cited by examiner

FIG. 9B

R_CODE

| 1 | 1 | 1 | -1 |
|---|---|---|---|
| 1 | 1 | -1 | 1 |
| 1 | -1 | 1 | 1 |
| -1 | 1 | 1 | 1 |

FIG. 10B

| 1 | -1 | -1 | -1 |
|---|----|----|----|
| -1 | -1 | -1 | 1 |
| -1 | -1 | 1 | -1 |
| 1 | 1 | -1 | -1 |

FIG. 14

CODE1

| -1 | 1  | 1  | 1  |
|----|----|----|----|
| 1  | -1 | 1  | 1  |
| 1  | 1  | -1 | 1  |
| 1  | 1  | 1  | -1 |

CODE2

| 1  | 1  | -1 | 1  |
|----|----|----|----|
| 1  | 1  | 1  | -1 |
| -1 | 1  | 1  | 1  |
| 1  | -1 | 1  | 1  |

CODE3

| -1 | 1  | 1  | 1  |
|----|----|----|----|
| 1  | 1  | -1 | 1  |
| 1  | -1 | 1  | 1  |
| 1  | 1  | 1  | -1 |

CODE4

| 1  | 1  | 1  | -1 |
|----|----|----|----|
| 1  | 1  | -1 | 1  |
| 1  | -1 | 1  | 1  |
| -1 | 1  | 1  | 1  |

CODE5

| -1 | 1  | 1  | 1  |
|----|----|----|----|
| 1  | 1  | 1  | -1 |
| 1  | 1  | -1 | 1  |
| 1  | -1 | 1  | 1  |

CODE6

| 1  | -1 | 1  | 1  |
|----|----|----|----|
| -1 | 1  | 1  | 1  |
| 1  | 1  | 1  | -1 |
| 1  | 1  | -1 | 1  |

CODE7

| 1  | 1  | -1 | 1  |
|----|----|----|----|
| 1  | -1 | 1  | 1  |
| -1 | 1  | 1  | 1  |
| 1  | 1  | 1  | -1 |

CODE8

| -1 | 1  | 1  | 1  |
|----|----|----|----|
| 1  | -1 | 1  | 1  |
| 1  | 1  | 1  | -1 |
| 1  | 1  | -1 | 1  |

CODE9

| 1  | -1 | 1  | 1  |
|----|----|----|----|
| -1 | 1  | 1  | 1  |
| 1  | 1  | -1 | 1  |
| 1  | 1  | 1  | -1 |

FIG. 16

R_CODE

| | | | | | | | |
|---|---|---|---|---|---|---|---|
| −1 | 1 | 1 | 1 | −1 | 1 | 1 | 1 |
| 1 | −1 | 1 | 1 | 1 | −1 | 1 | 1 |
| 1 | 1 | −1 | 1 | 1 | 1 | −1 | 1 |
| 1 | 1 | 1 | −1 | 1 | 1 | 1 | −1 |
| −1 | 1 | 1 | 1 | 1 | −1 | −1 | −1 |
| 1 | −1 | 1 | 1 | −1 | 1 | −1 | −1 |
| 1 | 1 | −1 | 1 | −1 | −1 | 1 | −1 |
| 1 | 1 | 1 | −1 | −1 | −1 | −1 | 1 |

M (top-left), M (top-right), M (bottom-left), −M (bottom-right)

TOUCH SENSOR AND A DISPLAY DEVICE INCLUDING THE SAME

CROSS-REFERENCE TO RELATED APPLICATION

This application claims priority under 35 U.S.C. § 119 to Korean Patent Application No. 10-2021-0048082 filed in the Korean Intellectual Property Office on Apr. 13, 2021, the disclosure of which is incorporated by reference herein in its entirety.

(a) TECHNICAL FIELD

The present invention relates to a touch sensor and a display device including the same.

(b) DESCRIPTION OF THE RELATED ART

A display device is an output device for presentation of information in visual form. Recent display devices have an information input function in addition to an image display function. Generally, the information input function may be implemented with a touch sensor for receiving a user's touch or a touch by a predetermined tool, e.g., an electronic pen. A touch sensor may be attached to a side of a display panel that displays an image display or may be integrally formed with the display panel. A user may input information by pressing or touching the touch sensor while watching the image displayed on the display panel.

A touch sensing portion of the touch sensor includes a plurality of electrodes, and determines a touched point (e.g., touch coordinates) by sensing a change in capacitance formed in the plurality of electrodes.

SUMMARY

An embodiment of the present invention provides a touch sensor that may control a phase of driving signals by updating a reference code at a predetermined time point to previously compensate (or, pre-compensate) a resistive-capacitive (RC) delay of the driving signals.

Another embodiment of the present invention provides a display device including the touch sensor.

An embodiment of the present invention provides a touch sensor including: a touch sensing area including driving electrodes and sensing electrodes; a driving signal generator which determines phases of driving signals based on a reference code and supplies the driving signals to the sensing electrodes, wherein the driving signals are sine waves; and a touch processor which receives sensing signals according to the driving signals from the sensing electrodes and determines a touch position based on the sensing signals and the reference code, wherein the driving signal generator controls the phases of the driving signals by updating the reference code at a predetermined time point.

The driving signal generator may supply the driving signals in parallel to driving electrodes included in a first group of the driving electrodes during a first driving period.

At least one phase of the driving signals supplied to the first group in a period corresponding to a cycle of the sine wave in the first driving period may be opposite to phases of the rest of the driving signals supplied to the first group in the period.

The reference code may include a matrix of 1 values and −1 values, and the value 1 and the value −1 may correspond to sine waves having opposite polarities.

The reference code may be an orthogonal code.

The number of rows of the matrix may correspond to the number of the driving electrodes in the first group, and the number of columns of the matrix corresponds to the number of times the cycle of the sine wave is repeated.

The driving signal generator may include: a sine wave generator which generates sine wave signals; and a code generator which outputs a first phase or an inverse phase of the first phase of each of the sine wave signals supplied from the sine wave generator in response to the reference code as the driving signals.

The driving signal generator may further include: a storage which stores a plurality of orthogonal codes, and the code generator selects one of the orthogonal codes as the reference code at the predetermined time point.

The driving signal generator may supply the driving signals in parallel to driving electrodes included in a second group of the driving electrodes during a second driving period.

A waveform of a first driving signal supplied to a first driving electrode of the first group during the first driving period may be different from a waveform of a second driving signal supplied to a first driving electrode of the second group during the second driving period.

The first driving period may include a plurality of unit periods in which the driving signals corresponding to the reference code are supplied to the first group.

The driving signals corresponding to a first reference code may be output in at least one of the unit periods of the first driving period, and the driving signals corresponding to a second reference code may be output in at least another one of the unit periods of the first driving period.

The touch processor may include: an analog signal processor which generates output signals by removing noise from the sensing signals; an analog digital converter which converts the output signals to digital sensing signals; and a digital processor which calculates sensed capacitances by demodulating the digital sensing signals using the reference code.

A maximum phase delay of the driving signals in the first driving period may be less than $\pi/4$.

An embodiment of the present invention provides a display device including: a display panel including pixels; a touch sensing part disposed on the display panel and including driving electrodes and sensing electrodes; a driving signal generator which determines phases of driving signals based on a reference code and supplies the driving signals to the sensing electrodes, wherein the driving signals are sine waves; and a touch processor which receives sensing signals according to the driving signals from the sensing electrodes and determines a touch position based on the sensing signals and the reference code, wherein the driving signal generator controls the phases of the driving signals by updating the reference code at a predetermined time point.

The display device may further include: a display driver which controls driving of the pixels.

The driving signal generator may supply the driving signals in parallel to driving electrodes included in a first group of the driving electrodes during a first driving period.

The reference code may include a matrix including 1 or −1 as a value thereof, and the value 1 and the value −1 may represent sine waves having opposite polarities.

The driving signal generator may include: a sine wave generator which generates sine wave signals; and a code generator which outputs a first phase or an inverse phase of the first phase of the sine wave signals supplied from the sine wave generator in response to the reference code as the driving signals.

An embodiment of the present invention provides a touch sensor including: a touch sensing area including a plurality of sensing electrodes and a plurality of driving electrodes; a driving signal generator configured to provide the driving electrodes with a plurality of driving signals, wherein phases and waveforms of the driving signals are based on a reference code; and a touch processor configured to detect a touch position based on capacitance values formed at intersections of the sensing electrodes and the driving electrodes, wherein the driving signal generator is further configured to update the reference code at predetermined time points.

The driving signals may be sinusoidal signals.

The reference code may be updated such that the driving signals satisfy orthogonality during consecutive driving periods.

The driving signal generator may include: a sine wave generator configured to generate a sine wave signal; a code generator configured to output the sine wave signal having a first phase or a second phase as one of the driving signals in response to the reference code; and a storage configured to store the reference code.

The first and second phases may be opposite.

The touch sensor and the display device including the same according to the embodiments of the present invention may sense a touch at a high speed through a multi-channel driving (MCD) method using a sine wave. In addition, the touch sensor, to satisfy orthogonality of a reference code defining a polarity of the sine wave, may update (e.g., refresh) the reference code corresponding thereto and driving signals at each time point when a phase delay exceeding $\pi/4$ is predicted. Accordingly, the phase delay of the driving signals is previously compensated (or, pre-compensated), and capacitance for each position of the touch sensing portion demodulated (or extracted) from a sensed signal may be accurately detected due to the orthogonality of the reference code.

Particularly, the touch sensor according to the embodiments of the present invention may have a characteristic that is robust to the influence of RC delay. Accordingly, in a touch environment of a large area (or a heavy load), the speed and accuracy of touch sensing may be increased.

BRIEF DESCRIPTION OF THE DRAWINGS

FIG. 9B illustrates an example of a reference code corresponding to the driving signals of FIG. 9A.

FIG. 10B illustrates an example of a reference code changed in response to the driving signals of FIG. 10A.

FIG. 14 illustrates an example of orthogonal codes stored in a storage portion included in the touch sensor of FIG. 5.

FIG. 16 illustrates an example of a reference code applied to driving of the touch sensor of FIG. 5.

DETAILED DESCRIPTION OF THE EMBODIMENTS

Figure 1A:
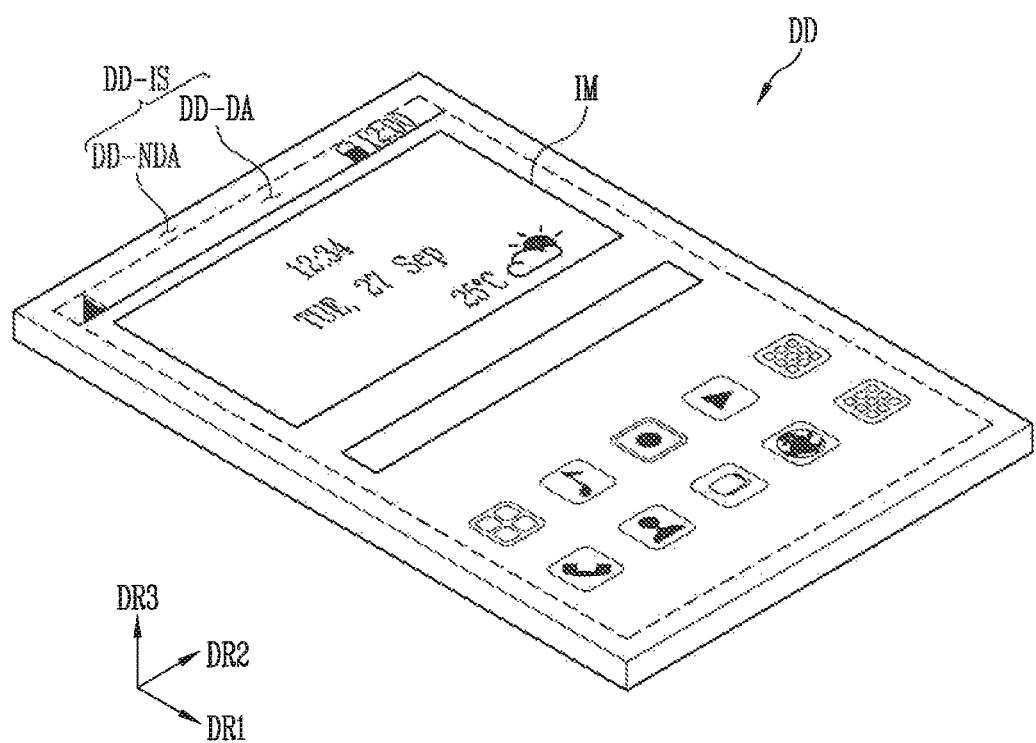
FIGS. 1A and 1B illustrate display devices according to embodiments of the present invention.

Hereinafter, an embodiment of the present invention will be described in detail with reference to the accompanying drawings. In the drawings, the same reference numerals may be used for the same elements, and thus, duplicate descriptions for the same elements may be omitted.

Figure 1B:
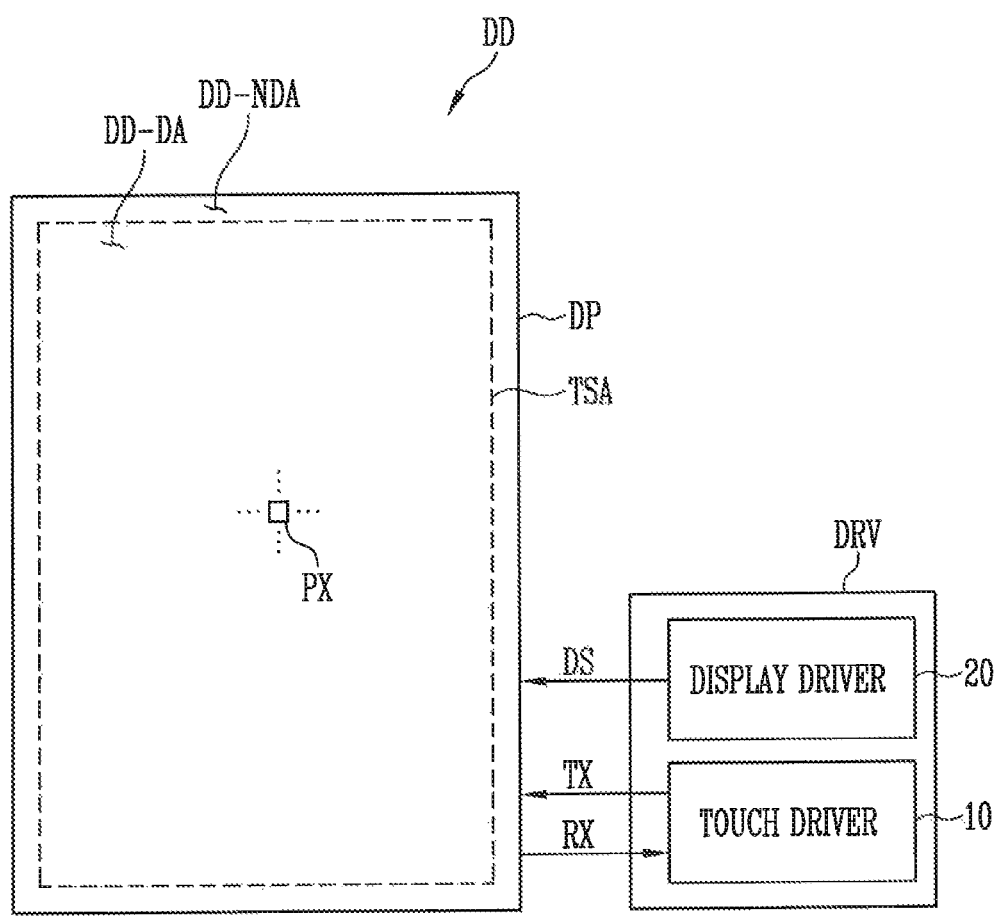

FIGS. 1A and 1B illustrate display devices according to embodiments of the present invention.

Figure 18:
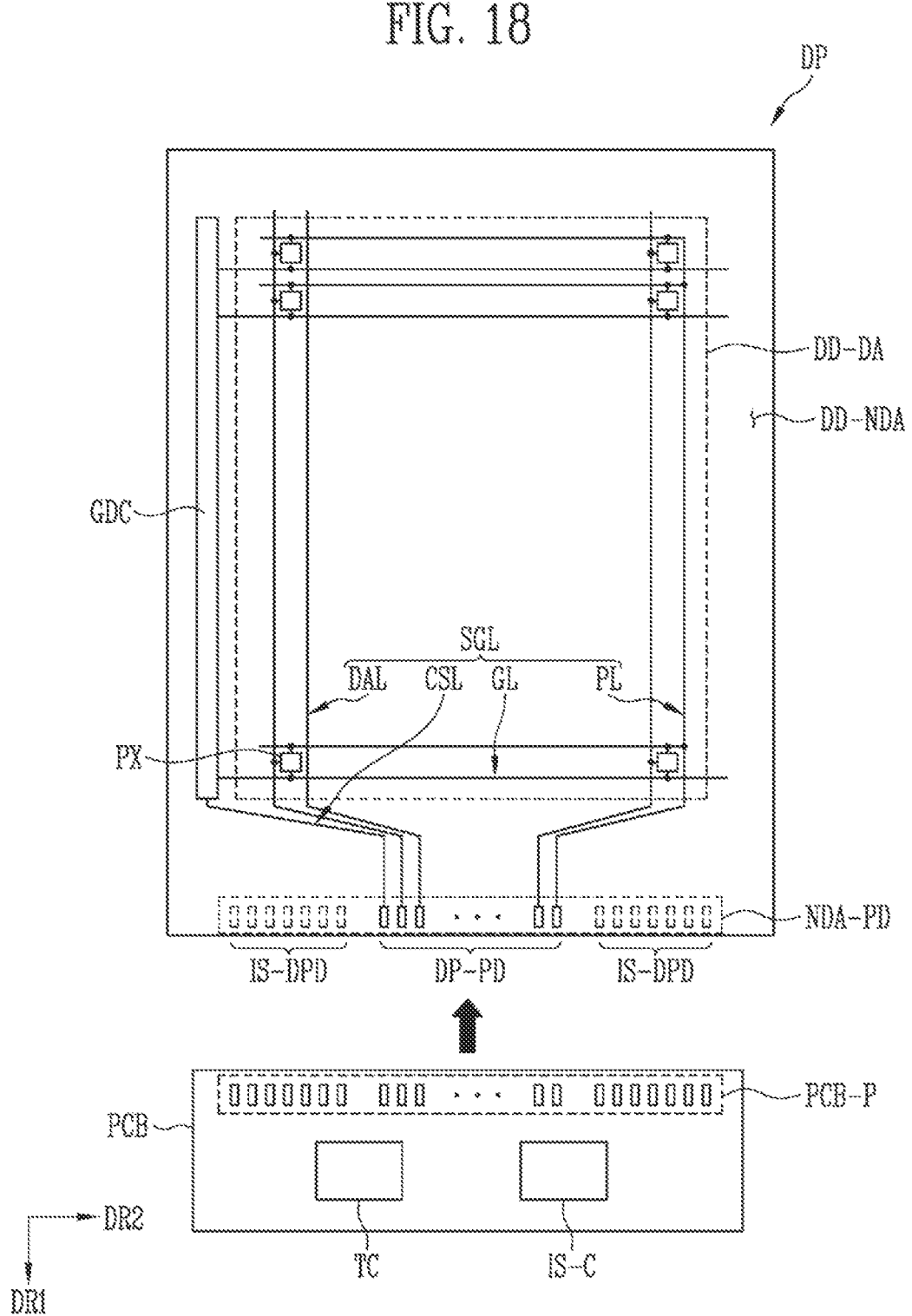
FIG. 18 illustrates a plan view of an example of a display panel included in the display device of FIG. 1A.

Referring to FIGS. 1A and 18, a display device DD may display a image IM by using a display surface DD-IS. The display surface DD-IS may be parallel to a plane formed by a first direction axis DR1 and a second direction axis DR2. A normal direction of the display surface DD-IS, in other words, a thickness direction of the display device DD, may be indicated by a third direction axis DR3.

Front surfaces (or upper surfaces) and rear surfaces (or lower surfaces) of respective members or layers described below may be distinguished by the third direction axis DR3. However, the first to third direction axes DR1, DR2, and DR3 are examples, and the directions indicated by the first to third direction axes DR1, DR2, and DR3 may be relative concepts and may be converted into other directions. Hereinafter, the first to third directions may be the direction indicated by the first to third direction axes DR1, DR2, and DR3, respectively, and may use the same reference numeral as the first to third direction axes DR1, DR2, and DR3.

In an embodiment of the present invention, the display device DD may include a display panel DP, a touch sensing area TSA (or touch sensing portion), and a driver DRV. The driver DRV may include a display driver 20 and a touch driver 10.

The display device DD shown in FIG. 1A may have a planar display surface. The present invention is not limited thereto, and the display device DD may have various types of display surfaces capable of displaying an image such as a curved display surface or a stereoscopic display surface. In a case in which the display device DD has the stereoscopic display surface, the stereoscopic display surface may include a plurality of display areas directed in different directions as an example. The stereoscopic display surface may be implemented as a polygonal columnar display surface.

In an embodiment of the present invention, the display device DD may be a flexible display device. For example, the display device DD may be applied to a foldable display device, a bendable display device, a rollable display device, and the like. The present invention is not limited thereto, and thus, the display device DD may be a rigid display device.

The display device DD shown in FIG. 1A is a display device DD that may be applied to a smartphone terminal. However, this is an example, and the display device DD may also be applied to a large-sized electronic device such as a television, a monitor, and an electric signboard. In addition, the display device DD may be applied to a small and medium-sized electronic device such as a tablet, a navigation device, a game device, and a smart watch. In addition, the display device DD may be applied to a wearable electronic device such as a head-mount display.

As shown in FIG. 1A, the display surface DD-IS of the display panel DP of the display device DD may include a display area DD-DA in which an image is displayed and a non-display area DD-NDA adjacent to the display area DD-DA.

A pixel PX may be provided in the display area DD_DA. The non-display area DD-NDA is an area in which an image is not displayed. The non-display area DD-NDA may be disposed outside the display area DD-DA. For example, the non-display area DD-NDA may surround the display area DD-DA.

In an embodiment of the present invention, the display area DD-DA may include the touch sensing area TSA. The touch sensing area TSA may be implemented by a touch sensor. The touch sensor may be a member including the touch sensing area TSA and the touch driver 10.

The touch sensing area TSA may be disposed corresponding to the display area DD-DA. In other words, the touch sensing area TSA may overlap the display area DD-DA.

In an embodiment of the present invention, the display driver 20 and the touch driver 10 may be disposed on a printed circuit board. However, this is an example, and an element having at least some functions of the display driver 20 and the touch driver 10 may be directly disposed on the display panel DP.

The display driver 20 may drive the display panel DR. For example, the display driver 20 may output a data signal DS corresponding to image data to the display panel DP.

The touch driver 10 may drive the touch sensing area TSA and the touch sensor. The touch driver 10 may provide a driving signal TX to the touch sensing area TSA, and may detect a change in capacitance in the touch sensing area TSA from a sensing signal RX received from the touch sensing area TSA to determine a touch position (or a touch sensing portion).

In an embodiment of the present invention, the touch driver 10 may include a driving signal generator and a touch processor.

In an embodiment of the present invention, the touch driver 10 and the display driver 20 may be implemented as separate driving circuit chips. However, this is an example, and at least some of functions of the touch driver 10 and the display driver 20 may be integrated into one driving circuit chip.

Figure 2A:
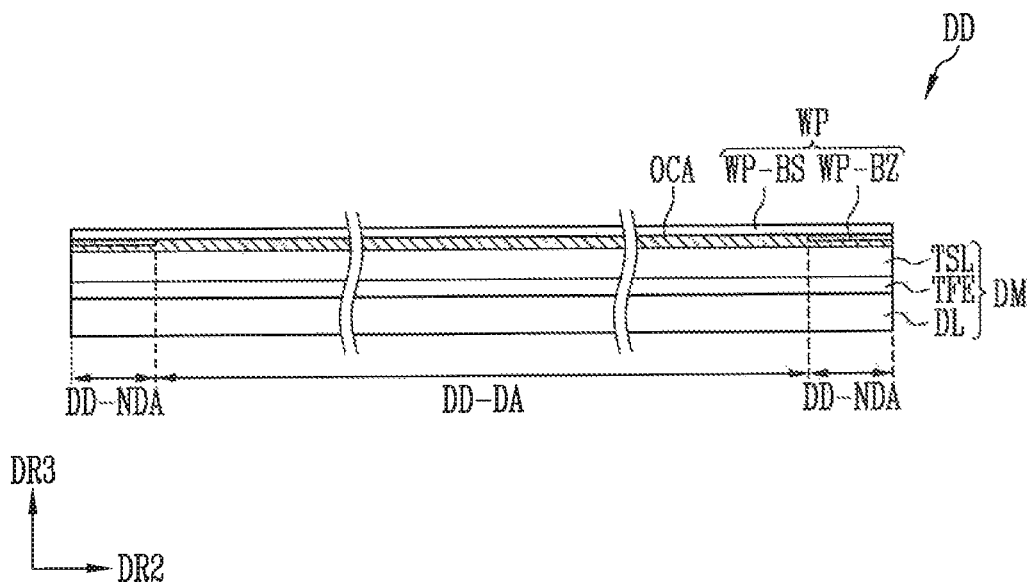
FIGS. 2A and 2B illustrate schematic cross-sectional views of a display device according to embodiments of the present invention.
Figure 2B:
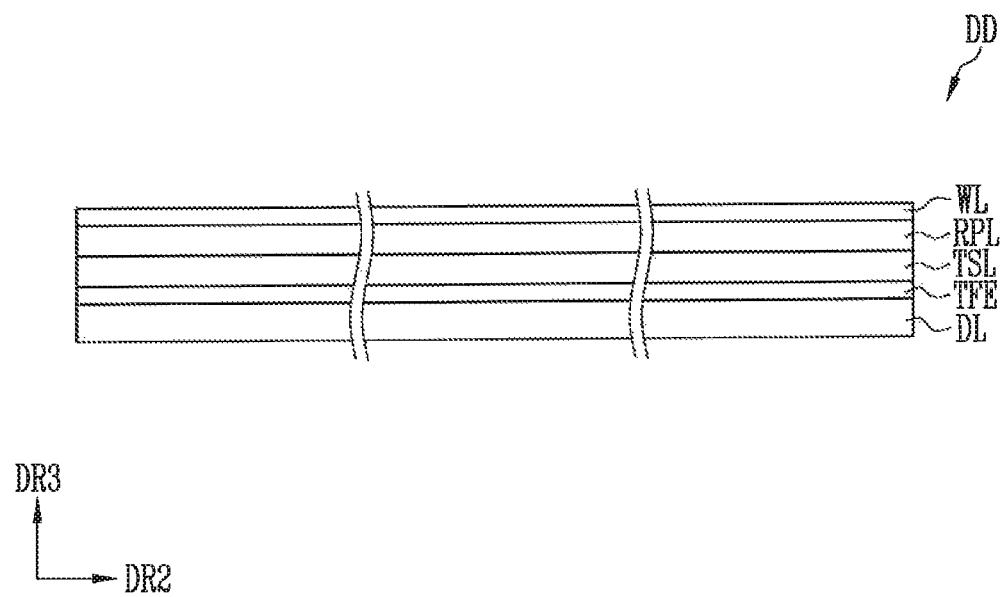

FIGS. 2A and 2B illustrate schematic cross-sectional views of a display device according to embodiments of the present invention.

FIGS. 2A and 2B illustrate stacking relationships of a functional panel and/or functional members configuring the display device DD.

Referring to FIGS. 1A, 2A, and 2B, the display device DD may include a display element layer DL, an encapsulation layer TFE, a touch sensor layer TSL, and a window unit WP or WL.

In an embodiment of the present invention, the display element layer DL, the encapsulation layer TFE, and the touch sensor layer TSL may be formed by a continuous process. The window unit WP or WL may be bonded to a configuration of a rear surface of the display element layer DL, the encapsulation layer TFE, and the touch sensor layer TSL through an adhesive member. The adhesive member may include a conventional adhesive or pressure-sensitive adhesive. The adhesive member shown in FIG. 2A may be an optically clear adhesive member OCA as an example.

In an embodiment of the present invention, the touch sensor layer TSL may sense a contact or an input by an external medium such as a hand or a pen with respect to the display surface DD-IS of the display device DD. The touch sensor layer TSL may be a component excluding the touch driver (for example, a driving signal generator and a touch processor).

In an embodiment, the encapsulation layer TFE and the display element layer DL may be referred to as a display panel. The display element layer DL may include a light emitting element, transistors for driving the light emitting element, and wires.

The encapsulation layer TFE may be directly disposed on the display element layer DL. In the present specification, "a B configuration is directly disposed on an A configuration" may mean that no separate adhesive layer or adhesive member is disposed between the A configuration and the B configuration. The B configuration may be formed through a continuous process after the A configuration is formed.

In an embodiment of the present invention, the touch sensor layer TSL may be directly disposed on the encapsulation layer TFE. The display element layer DL, the encapsulation layer TFE, and the touch sensor layer TSL may be referred to as a display module DM.

In the window unit WP or WL of FIG. 2A and FIG. 2B, another configuration and a corresponding configuration formed through a continuous process may be expressed as "layers". Another configuration and a configuration combined through an adhesive member may be expressed as "panels". For example, the window unit WP or WL may be referred to as a window panel WP or a window layer WL depending on presence/absence of a base layer.

In an embodiment of the present invention, as shown in FIG. 2A, an optically clear adhesive member OCA may be disposed between the display module DM and the window panel WP. In other words, the optically clear adhesive member OCA may be disposed between the display module DM and the window panel WP to attach them to each other.

The display module DM may be a light emitting type of display module, and is not particularly limited. For example, the display module DM may be an organic light emitting display module or a quantum dot light emitting display module.

In an embodiment of the present invention, the window panel WP may include a base film WP-BS and a light blocking pattern WP-BZ. The base film WP-BS may include a glass substrate and/or a synthetic resin film. The base film WP-BS is not limited to a single layer. The base film WP-BS may include two or more films bonded by an adhesive member.

The light blocking pattern WP-BZ may partially overlap the base film WP-BS. The light blocking pattern WP-BZ may be disposed on a rear surface of the base film WP-BS to form a bezel area of the display device DD, in other words, the non-display area DD-NDA.

The window panel WP may further include a functional coating layer that is disposed on an upper and/or lower surface of the base film WP-BS. The functional coating layer may include an anti-fingerprint layer, an anti-reflection layer, and a hard coating layer.

In an embodiment of the present invention, an additional anti-reflection member may be provided between the touch sensor layer TSL and the optically clear adhesive member OCA. The anti-reflection member reduces reflectance of external light incident from an upper side of the window panel WP.

In an embodiment of the present invention, as shown in FIG. 2B, the display device DD includes the display element layer DL, the encapsulation layer TFE, the touch sensor layer TSL, an anti-reflection layer RPL, and the window layer WL. Adhesive members may be omitted from the display device DD, and the touch sensor layer TSL, the anti-reflection layer RPL, and the window layer WL may be formed in a continuous process on a base surface provided by the encapsulation layer TFE. A stacking order of the touch sensor layer TSL and the anti-reflection layer RPL may be changed. For example, the touch sensor layer TSL may be provided between the anti-reflection layer RPL and the window layer WL.

The anti-reflection layer RPL reduces reflectance of external light incident from an upper side of the window layer WL. In an embodiment of the present invention, the anti-reflection layer RPL may include a phase retarder and a polarizer. The phase retarder may be a film type or a liquid crystal coating type, and may include a λ/2 phase retarder and/or a λ/4 phase retarder. The polarizer may also be a film type or liquid crystal coating type.

In an embodiment of the present invention, the anti-reflection layer RPL may include color filters. The color filters have a predetermined arrangement. The arrangement of the color filters may be determined in consideration of light emitting colors of pixels included in the display element layer DL. The anti-reflection layer RPL may further include a black matrix adjacent to the color filters.

Figure 3:
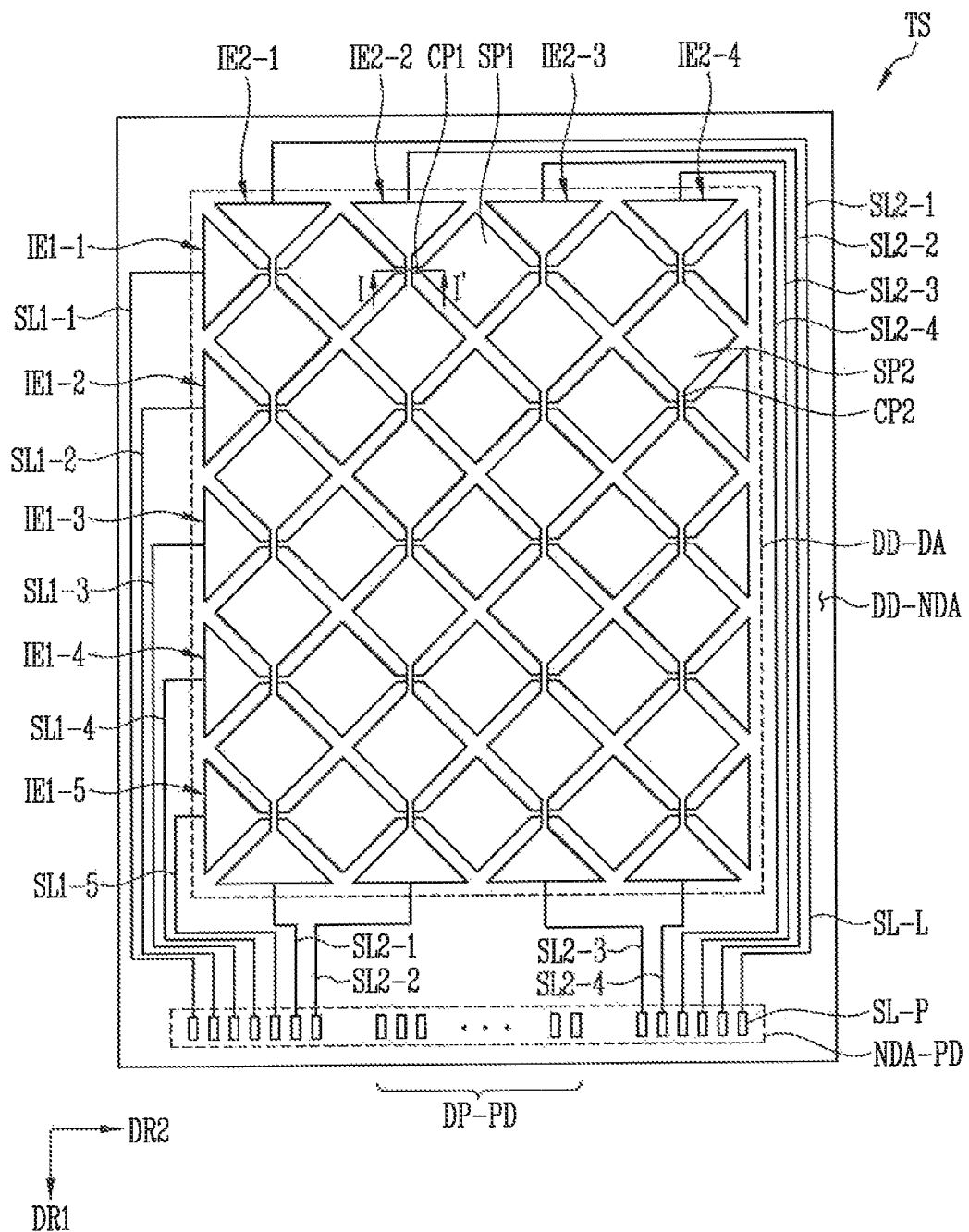
FIG. 3 illustrates a plan view of an example of a touch sensor included in the display device of FIG. 1A.

FIG. 3 illustrates a plan view of an example of a touch sensor included in the display device of FIG. 1A.

Referring to FIGS. 1A, 1B, and 3, a touch sensor TS may include first electrodes IE1-1, IE1-2, IE1-3, IE1-4 and IE1-5 (hereinafter referred to as driving electrodes), first signal lines SL1-1, SL1-2, SL1-3, SL1-4 and SL1-5 connected to the driving electrodes IE1-1 to IE1-5, second electrodes IE2-1, IE2-2, IE2-3 and IE2-4 (hereinafter referred to as sensing electrodes), and second signal lines SL2-1, SL2-2, SL2-3 and SL2-4 connected to the sensing electrodes IE2-1 to IE2-4. The touch sensor TS may further include a touch driver including a driving signal generator and a touch processor.

In an embodiment of the present invention, the touch sensor TS may further include an optical dummy electrode disposed in a boundary area between the driving electrodes IE1-1 to IE1-5 and the sensing electrodes IE2-1 to IE2-4.

The driving electrodes IE1-1 to IE1-5 and the sensing electrodes IE2-1 to IE2-4 cross each other. The driving electrodes IE1-1 to IE1-5 are arranged substantially parallel to the first direction axis DR1, and respectively have a shape extending parallel to the second direction axis DR2. The sensing electrodes IE2-1 to IE2-5 are arranged substantially parallel to the second direction axis DR2, and respectively have a shape extending parallel to the first direction axis DR1.

The driving electrodes IE1-1 to IE1-5 and the sensing electrodes IE2-1 to IE2-4 may be included in a touch sensing portion (e.g., a touch sensing area). The touch sensing area may correspond to the display area (DD-DA in FIG. 1A).

Each of the driving electrodes IE1-1 to IE1-5 includes first sensor portions SP1 and first connecting portions CP1. For example, a first connecting portion CP1 connects an adjacent pair of first sensor portions SP1 to each other. Each of the sensing electrodes IE2-1 to IE2-4 includes second sensor portions SP2 and second connecting portions CP2. For example, a second connecting portion CP2 connects an adjacent pair of second sensor portions SP2 to each other.

In an embodiment of the present invention, the driving electrodes IE1-1 to IE1-5 and the sensing electrodes IE2-1 to IE2-4 may have a shape (for example, a bar shape) without distinction between its sensor portions and connecting portions. Although the first sensor portions SP1 and the second sensor portions SP2 having a rhombus shape are illustrated as an example, the present invention is not limited thereto, and the first sensor portions SP1 and the second sensor portions SP2 may have another polygonal shape.

In addition, in an embodiment of the present invention, the driving electrodes IE1-1 to IE1-5 and the sensing electrodes IE2-1 to IE2-4 may be formed in a mesh pattern.

In one driving electrode, the first sensor portions SP1 are arranged along the second direction axis DR2, and in one sensing electrode, the second sensor portions SP2 are arranged along the first direction axis DR1. Each of the first connecting portions CP1 connects adjacent first sensor portions SP1, and each of the second connecting portions CP2 connects adjacent second sensor portions SP2.

In an embodiment of the present invention, the second connecting portions CP2, the first sensor portions SP1, and the second sensor portions SP2 may be disposed on the same layer, and the first connecting portions CP1 may be disposed on a layer different from the second connecting portions CP2, the first sensor portions SP1, and the second sensor portions SP2. For example, the first and second connecting portions CP1 and CP2 may overlap each other. Accordingly, the driving electrodes IE1-1 to IE1-5 and the sensing electrodes IE2-1 to IE2-4 are not short-circuited with each other.

The first signal lines SL1-1 to SL1-5 are connected to one end of each of the driving electrodes IE1-1 to IE1-5, respectively. The second signal lines SL2-1 to SL2-4 are connected to ends of the sensing electrodes IE2-1 to IE2-4, respectively.

In an embodiment of the present invention, the first signal lines SL1-1 to SL1-5 may be connected to different ends of the driving electrodes IE1-1 to IE1-5.

In an embodiment of the present invention, the first signal lines SL1-1 to SL1-5 may be connected to different ends of the driving electrodes IE1-1 to IE1-5 alternately in row units. For example, the first first signal line SL1-1 may be connected to the left end of the first driving electrode IE1-1, and the second first signal line SL1-2 may be connected to the right end of the second driving electrode IE1-2.

In an embodiment of the present invention, the second signal lines SL2-1 to SL2-4 may be respectively connected to only one end of each of the second sensing electrodes IE2-1 to IE2-4.

Driving signals may be supplied to the driving electrodes IE1-1 to IE1-5 through the first signal lines SL1-1 to SL1-5. Signals sensed from the sensing electrodes IE2-1 to IE2-4 through the second signal lines SL2-1 to SL2-4 may be transmitted to the touch processor.

The first signal lines SL1-1 to SL1-5 and the second signal lines SL2-1 to SL2-4 may include a line portion SL-L and a sensing pad portion SL-P.

The sensing pad portion SL-P may be provided in a pad area NDA-PD.

The display panel DP may include data signal pads DP-PD to which signal lines for transmitting a data signal to pixels PX are connected. The data signal pads DP-PD may be provided at a center of the pad area NDA-PD. The sensing pad portion SL-P may be disposed at respective sides of the data signal pads DP-PD.

However, this is an example, and the sensing pad portion SL-P may be concentrated and disposed only at the left or right side of the data signal pads DP-PD. In this case, the first signal lines SL1-1 to SL1-5 and the second signal lines SL2-1 to SL2-4 may be concentrated and extended to one side corresponding to the sensing pad portion SL-P.

However, this is an example, and the flat shape of the touch sensor TS is not limited thereto.

Figure 4:
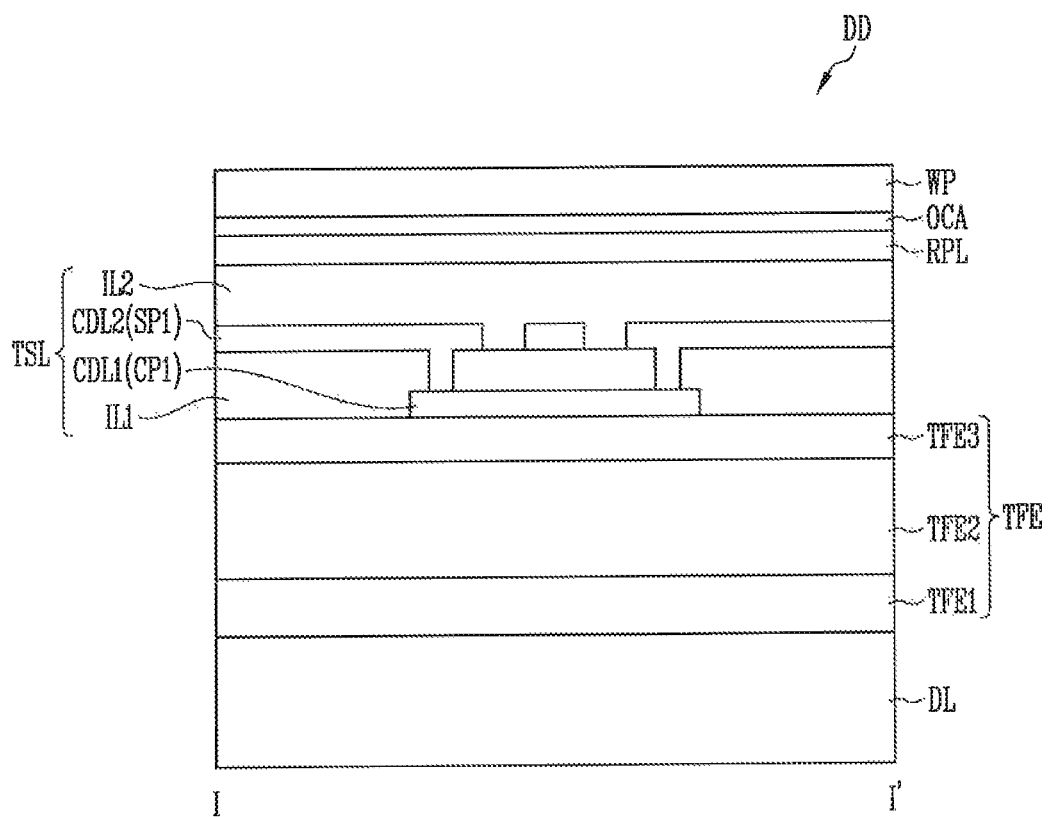
FIG. 4 illustrates a schematic cross-sectional view of a display device including a portion I-I' of the touch sensor of FIG. 3.

FIG. 4 illustrates a schematic cross-sectional view of a display device including a portion I-I' of the touch sensor of FIG. 3.

Referring to FIGS. 2A, 2B, 3, and 4, the display device DD may include the display element layer DL, the encapsulation layer TFE, and the touch sensor layer TSL. The display device DD may further include the anti-reflection layer RPL and the window panel WP.

All or at least a portion of the display device DD may be flexible.

The display element layer DL may include circuit elements such as transistors disposed on a base layer (e.g., a substrate) such as a synthetic resin layer, and a light emitting element connected to the circuit elements. The circuit elements may include signal lines, pixel circuits, and the like. The light emitting element may be formed on the circuit elements.

In some embodiments of the present invention, the light emitting element may be a self-light emitting element, and may be an organic light emitting element, an inorganic light emitting element, or a light emitting element configured of a combination of inorganic and organic materials. However, this is an example, and the display element layer DL may include a light emitting element and/or circuit devices for implementing a liquid crystal display, a plasma display device, a quantum dot display device, and the like.

The encapsulation layer TFE may be disposed on the display element layer DL. The encapsulation layer TFE may be in direct contact with the display element layer DL. The encapsulation layer TFE may seal the display element layer DL. The encapsulation layer TFE may be flexible.

The encapsulation layer TEE may include at least one insulating layer. In an embodiment of the present invention, the encapsulation layer TFE may include at least one encapsulation organic layer TFE2, and encapsulation inorganic layers TFE1 and TFE3 provided on upper and lower surfaces of the at least one encapsulation organic layer TFE2, respectively. For example, the encapsulation layer TFE may include a first encapsulation inorganic layer TFE1, an encapsulation organic layer TFE2, and a second encapsulation inorganic layer TFE3 that are sequentially stacked on the display element layer DL. However, this is an example, and the number of the encapsulation organic layers and the number of the encapsulation inorganic layers are not limited thereto. For example, a plurality of encapsulation organic layers and a plurality of encapsulation inorganic layers may be alternately stacked. In this case, the uppermost layer of the encapsulation layer TFE may be an inorganic layer.

The touch sensor layer TSL may be provided on the second encapsulation inorganic layer TFE3 through a continuous process. In an embodiment of the present invention, the touch sensor layer TSL may include a first conductive layer CDL1, a first insulating layer IL1, a second conductive layer CDL2, and a second insulating layer IL2.

The first conductive layer CDL1 may be provided on the second encapsulation inorganic layer TFE3.

In an embodiment of the present invention, the first conductive layer CDL1 may form the first connecting portions CP1 of the touch sensor layer TSL. In this case, the second conductive layer CDL2 may form the first sensor portions SP1, the second sensor portions SP2, and the second connecting portions CP2 of the touch sensor layer TSL. In this case, the first connecting portions CP1 are formed in a different layer than at least the first sensor portions SP1.

In an embodiment of the present invention, the first conductive layer CDL1 may form the first sensor portions SP1, the second sensor portions SP2, and the second connecting portions CP2 of the touch sensor layer TSL. In this case, the second conductive layer CDL2 may form the first connecting portions CP1 of the touch sensor layer TSL.

The first conductive layer CDL1 may contain a transparent conductive material or an opaque metal.

In embodiments of the present invention, it will be described on the premise that the first conductive layer CDL1 forms the first connecting portions CP1.

The first insulating layer IL1 may be provided on the encapsulation layer TFE to cover the first conductive layer CDL1. The first insulating layer RA may include contact holes. A portion of the first conductive layer CDL1 may be exposed through the contact holes. The first insulating layer IL1 may include at least one of an organic insulating layer including an organic material and an inorganic insulating layer including an inorganic material. For example, the first insulating layer IL1 may include at least one of a silicon oxide, a silicon nitride, and a silicon oxynitride. The first insulating layer IL1 may have a single-layered or multi-layered structure.

The second conductive layer CDL2 may be provided on the first insulating layer IL1. In an embodiments of the present invention, the second conductive layer CDL2 may form the first sensor portions SP1, the second sensor portions SP2, and the second connecting portions CP2 of the touch sensor layer TSL. The second conductive layer CDL2 may be connected to the first conductive layer CDL1 through contact holes. In this case, two adjacent first sensor portions SP1 may be electrically connected to each other.

In an embodiment of the present invention, the second conductive layer CDL2 may contain a transparent conductive material or an opaque metal. The first conductive layer CDL1 and the second conductive layer CDL2 may contain the same material or may contain different materials.

The second insulating layer IL2 may be disposed on the first insulating layer IL1 to cover the second conductive layer CDL2. The second insulating layer IL2 prevents the second conductive layer CDL2 from being exposed to the outside, thereby preventing corrosion and contamination of the second conductive layer CDL2. The second insulating layer IL2 may include at least one of an organic insulating layer and an inorganic insulating layer.

In an embodiment of the present invention, the anti-reflection layer RPL may be provided on the touch sensor layer TSL. The anti-reflection layer RPL reduces the reflectance of external light incident from the upper side of the window panel WP.

The optically clear adhesive member OCA may be provided on the anti-reflection layer RPL, and the window panel WP may be bonded to the configuration of the rear surface thereof through an adhesive member.

Figure 5:
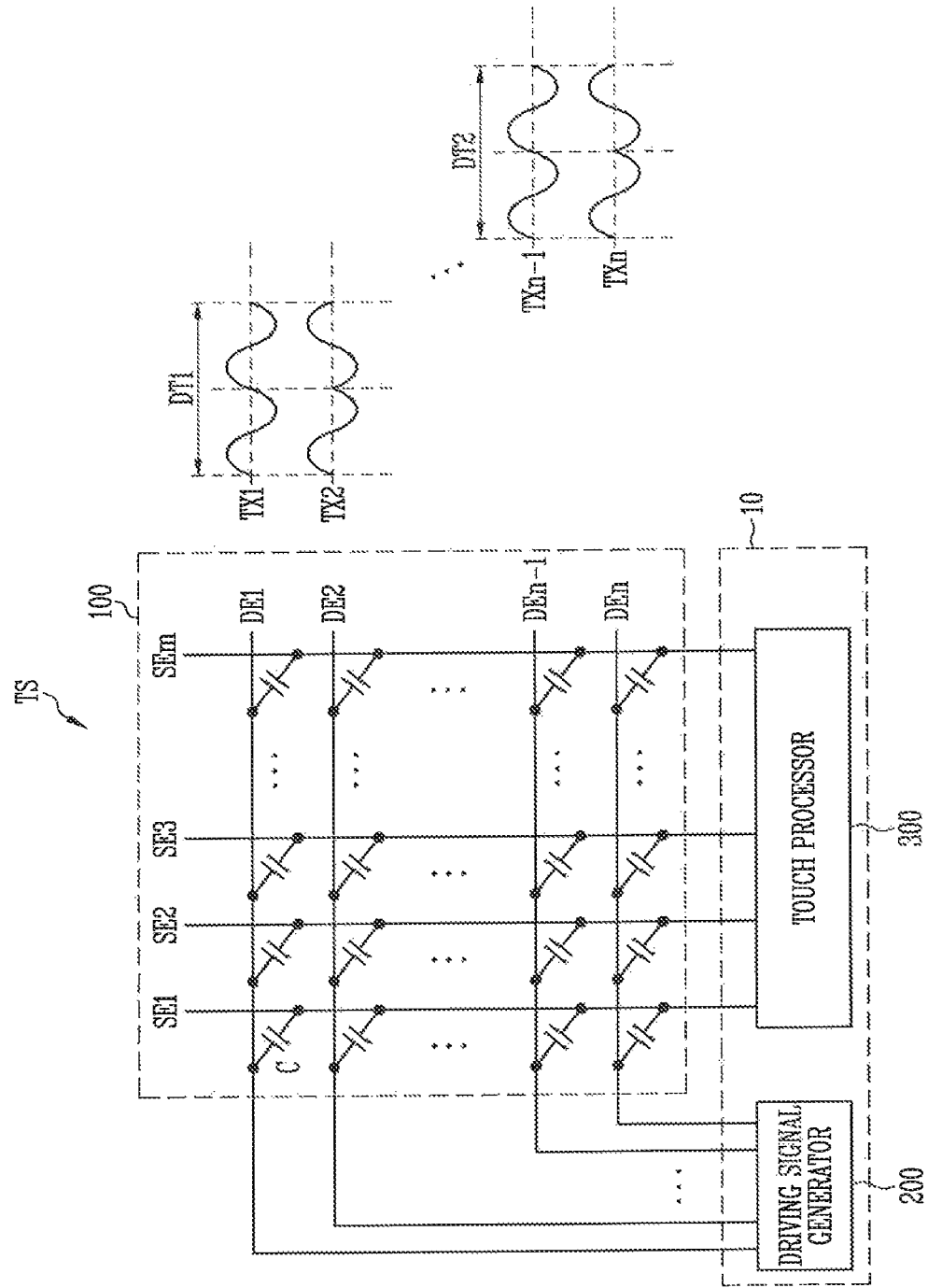
FIG. 5 illustrates a touch sensor according to embodiments of the present invention.

FIG. 5 illustrates a touch sensor according to embodiments of the present invention.

Referring to FIGS. 1B and 5, the touch sensor TS may include a touch sensing portion 100, a driving signal generator 200, and a touch processor 300.

The touch sensing portion 100 may include driving electrodes DE1 to DEn (wherein n is an integer larger than 1) and sensing electrodes SE1 to SEm (wherein m is an integer larger than 1). As described with reference to FIG. 3, the driving electrodes DE1 to DEn and the sensing electrodes SE1 to SEm may be included in the touch sensing area (for example, the display area DD_DA). The driving electrodes DE1 to DEn and the sensing electrodes SE1 to SEm may be disposed to cross each other within the touch sensing area. Accordingly, a capacitance C may be formed between the driving electrode and the sensing electrode that intersect or overlap each other. For example, a change in the capacitance C according to a touch may occur at each of n×m positions. The change in the capacitance C detected in response to the touch may be different from a change in the capacitance C in an area where no touch event occurs.

The driving electrodes DE1 to DEn may be connected to the driving signal generator 200 through the first signal lines (e.g., SL1-1 to SL1-5). The sensing electrodes SE1 to SEm may be connected to the touch processor 300 through the second signal lines (e.g., SL2-1 to SL2-4).

Since the disposition structure between the driving electrodes DE1 to DEn and the sensing electrodes SE1 to SEm has been described above with reference to FIG. 3, a duplicate description thereof will be omitted.

In an embodiment of the present invention, the touch sensor TS may sense a touch by a code-division multiplexing method. For example, the driving signal generator 200 may supply driving signals in parallel in units of a predetermined driving electrode group. Output values obtained by mixing the capacitance values formed between the driving electrodes DE1 to DEn and the sensing electrodes SE1 to SEm may be output to each of the sensing electrodes SE1 to SEm. The touch processor 300 may detect a touch position based on the mixed capacitance values.

In FIG. 5, a description will be made on the premise that the two driving electrodes (for example, the first driving electrode DE1 and the second driving electrode DE2) are a group. For example, a first driving signal TX1 and a second driving signal TX2 of a sine wave may be supplied substantially simultaneously to the first driving electrode DE1 and the second driving electrode DE2, respectively. An (n−1)-th driving signal TXn−1 and an n-th driving signal TXn may be substantially simultaneously supplied to an (n−1)-th driving electrode DEn−1 and an n-th driving electrode Den, respectively.

In some embodiments of the present invention, the first driving signal TX1 and the (n−1)-th driving signal TXn−1 may be supplied at different times. For example, based on the first driving signal TX1 and the second driving signal TX2, the mixed capacitance values in areas corresponding to the first driving electrode DE1 and the second driving electrode DE2 may be output. Similarly, based on the (n−1)-th driving signal TXn−1 and the n-th driving signal TXn, the mixed capacitance values in areas corresponding to the (n−1)-th driving electrode DEn−1 and the n-th driving electrode DEn may be output.

As described above, the driving electrodes DE1 to DEn may be grouped into units of a plurality of driving electrodes and driven at the same time. This may be understood as multi-channel driving (MCD). In FIG. 5, the driving electrodes DE1 to DEn may be simultaneously driven (for example, 2-MCD) in units of two driving electrodes. However, this is an example, and the number of driving electrodes to be grouped is not limited thereto.

The driving signal generator 200 may supply the driving signals TX1 to TXn to each of the driving electrodes DE1 to DEn. The driving signals TX1 to TXn may be predetermined sinusoidal signals. The driving signal generator 200 may supply the first and second driving signals TX1 and TX2 that satisfy orthogonality during a first driving period DT1 to the first and second driving electrodes DE1 and DE2, respectively. As will be discussed below, the reference code R_CODE is updated such that the first and second driving signals TX1 and TX2 satisfy orthogonality during consecutive driving periods.

In an embodiment of the present invention using the code division multiple access method, the mixed capacitance values included in the sensing signal may be distinguished only when the driving signals satisfy orthogonality. In this case, the touch position may be detected only when the mixed capacitance values are distinguished.

The term orthogonality, when performing a logic operation on a digital signal or performing a digital logic operation by modulating an analog signal into a digital signal, may mean a property of a variable that outputs a value of 1 when the same variable as itself is calculated and a value of 0 when a variable other than itself is calculated. In other words, a value of 1 is output when the same variable is calculated and a value of 0 is output when a different variable is calculated. Accordingly, when calculating a touch sensing value based on a difference in capacitance due to a touch by such orthogonality, the mixed capacitances are independently classified, and thus, a noise component may be easily eliminated.

For example, reference codes corresponding to the phases of the first and second driving signals TX1 and TX2 may be set. When the reference code is set as an orthogonal code having orthogonality, and when the phases of the first and second driving signals TX1 and TX2 are output corresponding to the orthogonal code, noise may be removed when digitally modulating/demodulating the sensing signal, and an amplified sensing value for the corresponding position of the touch sensing portion 100 may be obtained.

The driving signal generator 200 may supply the (n−1)-th and north driving signals TXn−1 and TXn satisfying the orthogonality during a second driving period DT2, which is different from the first driving period DT1, to the (n−1)-th and n-th driving electrodes DEn−1 and DEn, respectively.

In an embodiment of the present invention, the driving signal generator 200 may determine phases and waveforms of the driving signals TX1 to TXn based on the reference code R_CODE. The reference code R_CODE may be expressed as a square matrix including component 1 or component −1. The component 1 and the component −1 may be referred to as sine waves having opposite polarities. The reference code R_CODE may be referred to as digital data. It is to be understood that the reference code R_CODE is not limited to being expressed as a square matrix including 1s and −1s values. For example, the reference code R_CODE may be expressed as a plurality of values corresponding to intersections of the sensing electrodes SE1 to SEm and the driving electrodes DE1 to DEn such that the present invention can be implemented in devices including touch sensing portions of different shapes and sizes.

In addition, the driving signal generator 200 may control phases of the driving signals TX1 to TXn by updating the reference code at each predetermined time point.

The touch processor 300 may receive sensing signals according to the driving signals TX1 to TXn from the sensing electrodes SE1 to SEm. The sensing signals may include the mixed capacitance values. The touch processor 300 may detect (e.g., determine) a touch position based on the sensing signals and the reference code.

Figure 6:
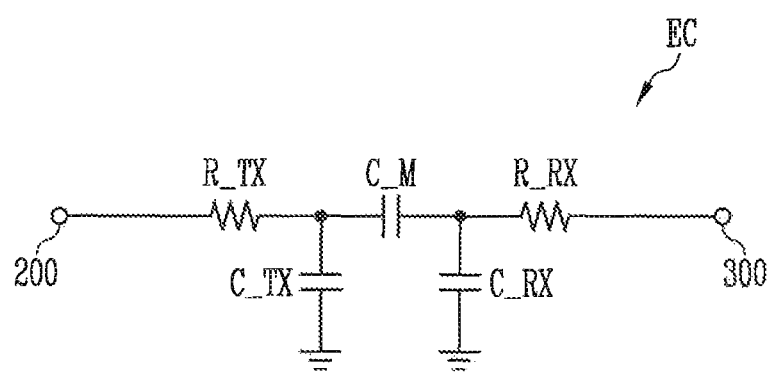
FIG. 6 illustrates an example of an equivalent circuit with respect to a circuit configuration between a driving signal generator and a touch processor included in the touch sensor of FIG. 5.

FIG. 6 illustrates an example of an equivalent circuit with respect to a circuit configuration between a driving signal generator and a touch processor included in the touch sensor of FIG. 5.

Referring to FIGS. 5 and 6, an equivalent circuit EC may include a transmission resistance (or resistor) R_TX, a transmission capacitor C_TX, a sensing capacitor C_M, a reception capacitor C_RX, and a reception resistance (or resistor) R_RX.

The transmission resistor R_TX may be connected between the driving signal generator 200 and a first electrode of the sensing capacitor C_M, the transmission capacitor C_TX may be connected between the first electrode of the sensing capacitor C_M and ground, the receiving capacitor C_RX may be connected between a second electrode of the sensing capacitor C_M and the ground, and the reception resistor R_RX may be connected between the second electrode of the sensing capacitor C_M and the touch processor 300. For example, the equivalent circuit EC may include one selected from the driving electrodes DE1 to DEn, and one of the sensing electrodes SE1 to SEm forming a capacitance with the selected driving electrode. In other words, the equivalent circuit EC may correspond to the first driving electrode DE1 and the first sensing electrode SE1 forming a capacitance with the first driving electrode DE1.

The transmission resistance R_TX may be an equivalent resistance of the selected driving electrode and a signal line connected to the selected driving electrode, and the transmission capacitor C_TX may be an equivalent parasitic capacitance of the selected driving electrode and a signal line connected to the selected driving electrode. The reception resistance R_RX may be an equivalent resistance of the selected sensing electrode and a signal line connected thereto, and the receiving capacitor C_RX may be an equivalent parasitic capacitance of the selected sensing electrode and a signal line connected thereto.

As such, when a driving signal is supplied to the driving electrode, the driving signal may have a resistive-capacitive (RC) delay due to the transmission resistance R_TX and the transmission capacitor C_TX. Similarly, the sensing signal may have an RC delay due to the reception resistance R_RX and the reception capacitor C_RX. The RC delay may cause a phase delay of the driving signal and/or sensing signal.

The RC delay of the driving signal may have a deviation for each driving electrode due to a relative distance between the driving electrode and the driving signal generator 200, a length of a signal line connected to the driving electrode, and the like. In addition, the RC delay of the sensing signal may have a deviation for each sensing electrode due to lengths of signal lines connected to the driving electrode.

For example, the RC delay of the first driving signal TX1 may be larger than the RC delay of the second driving signal TX2.

Due to the deviation and accumulation of the RC delay, the phase of the driving signal, which is a sinusoidal wave in the driving electrodes DE1 to DEn, may be delayed, and a phase delay deviation may occur. In addition, the phase delay deviation of the sensing signals may be generated by the phase delay and/or phase delay deviation of the driving signals.

Accordingly, the orthogonality (for example, orthogonality of the reference codes corresponding to the driving signals) of the driving signals (for example, the first driving signal TX1 and the second driving signal TX2) may be broken, noises of the sensing signal and a sensing value calculated therefrom may increase, and a signal-to-noise ratio (SNR) may decrease.

For example, as the display device DD and the touch sensor TS become larger, the RC delay of the driving signals and the deviation of the RC delay may increase. Therefore, probability of breaking the orthogonality of the reference code due to the phase delay of the driving signals increases.

The touch sensor TS according to the embodiments of the present invention may control the phase delay of the driving signals by updating the reference code at each predetermined time point so that the orthogonality of the reference code corresponding to the driving signals is not broken by the RC delay and the phase delay. In other words, the driving signal generator 200 may update the reference code including the polarity of the sine wave of the driving signals at each time point to compensate for the phase delay of the driving signals in advance.

A touch sensor TS according to an embodiment of the present invention may include a touch sensing portion (or area) 100 including the driving electrodes DE1 to DEn and the sensing electrodes SE1 to SEm; a driving signal generator 200 which determines phases of driving signals TX1 to TXn based on the reference code R_CODE and supplies the driving signals TX1 to TXn to the sensing electrodes SE1 to SEm, wherein the driving signals TX1 to TXn are sine waves; and a touch processor 300 which receives sensing signals according to the driving signals TX1 to TXn from the sensing electrodes SE1 to SEm and determines a touch position based on the sensing signals and the reference code R_CODE, wherein the driving signal generator 200 controls the phases of the driving signals TX1 to TXn by updating the reference code R_CODE at a predetermined time point.

Figure 7:
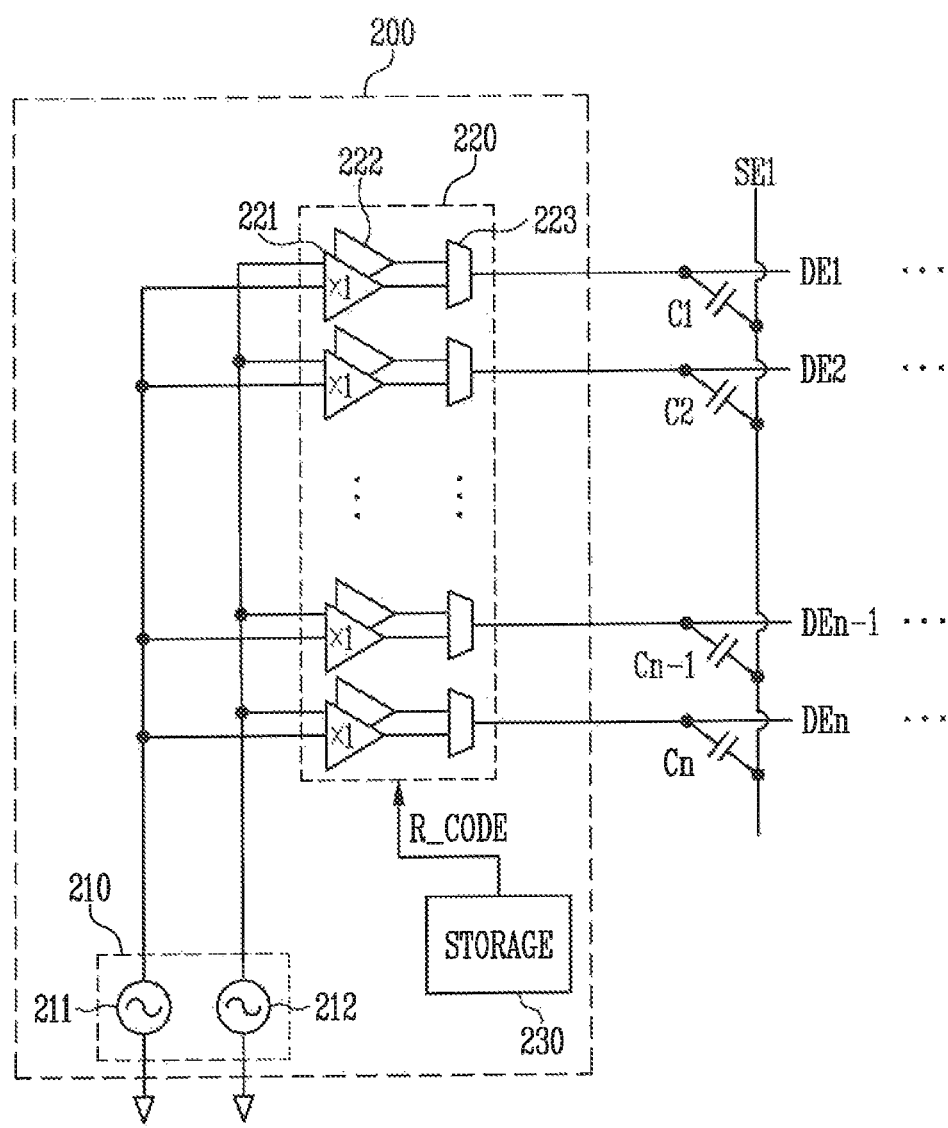
FIG. 7 illustrates an example of a driving signal generator included in the touch sensor of FIG. 5.

FIG. 7 illustrates an example of a driving signal generator included in the touch sensor of FIG. 5.

Referring to FIGS. 5 and 7, the driving signal generator 200 may include a sine wave generator 210 and a code generator 220. In an embodiment of the present invention, the driving signal generator 200 may further include a storage 230.

The sine wave generator 210 may generate a sine wave for a driving signal. In an embodiment of the present invention, the sine wave generator 210 may include a first power source 211 and a second power source 212. The first power source 211 and the second power source 212 may generate sinusoidal signals. For example, the sinusoidal signals output from the first power source 211 and the second power source 212 may have the same frequency, the same phase, and the same amplitude.

However, this is an example, and the sine wave generator 210 may include only one power source.

The sine wave signals output from the sine wave generator 210 may be provided to the code generator 220. The code generator 220 may output a sine wave signal having a first phase (e.g., a first phase signal) or a second phase (e.g., a second phase signal) as driving signals in response to a reference code R_CODE. The reference code R_CODE may be provided from the storage 230. The first and second phases may be opposite.

The reference code R_CODE may include a matrix corresponding to a unit of the driving electrode used for multi-channel driving. For example, the reference code R_CODE may include a square matrix. Each component of the square matrix may include 1 or −1. 1 and −1 may refer to sine waves of opposite polarities. For example, when component 1 refers to a waveform of sin(x), component −1 may refer to a waveform of − sin(x).

The code generator 220 may include a first code generator 221 and a second code generator 222. The code generator 220 may further include an analog multiplexer 223. The first code generator 221, the second code generator 222, and the analog multiplexer 223 may be connected to each of the driving electrodes DE1 to DEn.

The first code generator 221 may be connected to the first power source 211. The first code generator 221 may output the first phase signal of an input sine wave signal.

The second code generator 222 may be connected to the second power source 212. The second code generator 222 may output the second phase signal of an input sine wave signal.

The analog multiplexer 223 may select and output one of the first phase signal supplied from the first code generator 221 and the second phase signal supplied from the second code generator 222. In an embodiment of the present invention, the analog multiplexer 223 may be controlled based on the reference code R_CODE. For example, the analog multiplexer 223 may output the second phase signal in response to a value of −1 of the reference code R_CODE, or may output the first phase signal in response to a value of 1 of the reference code R_CODE.

A signal output from the analog multiplexer 223 is a driving signal, and may be provided to one of the driving electrodes DE1 to DEn.

Capacitances C1 to Cn resulting from a touch may be generated between the driving electrodes DE1 to DEn and the first sensing electrode SE1 according to the output of the driving signals.

The storage 230 may store a plurality of orthogonal codes corresponding to multi-channel driving. For example, in a case of a 4-MCD method in which touch detection is performed through a code division multiple access method in units of four driving electrodes, the storage 230 may include orthogonal codes corresponding to a 4×4 matrix. In a case of an 8-MCD method in which touch detection is performed in units of eight driving electrodes, the storage 230 may include orthogonal codes corresponding to an 8×8 matrix.

For example, a matrix in which a row component is substituted with a column component and a square matrix having the same characteristic as an original matrix may be stored as matrixes that satisfy an orthogonal code.

The code generator 220 may select (e.g., update) one of the orthogonal codes as the reference code R_CODE at a predetermined time point. The time point may be a time point when orthogonality of the reference code of the driving signals is broken due to the RC delay. The time points are detected by an experiment before product shipment, and may be set in the touch driver 10.

For example, when the phase delay value of a predetermined driving signal is larger than $\pi/4$, the orthogonality of the reference code corresponding thereto may be broken. Accordingly, the time point at which the reference code R_CODE is updated may be determined within a time period in which the phase delay value of the predetermined driving signal does not exceed $\pi/4$. Alternatively, during a period in which the driving signals are supplied in parallel, a phase delay deviation between the driving signals may be determined within a time period not exceeding $\pi/4$.

Figure 8:
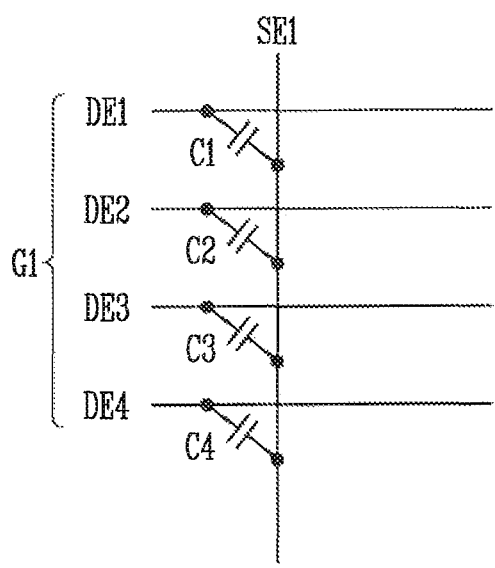
FIG. 8 schematically illustrates an example of a portion of a touch sensing portion included in the touch sensor of FIG. 5.
Figure 9A:
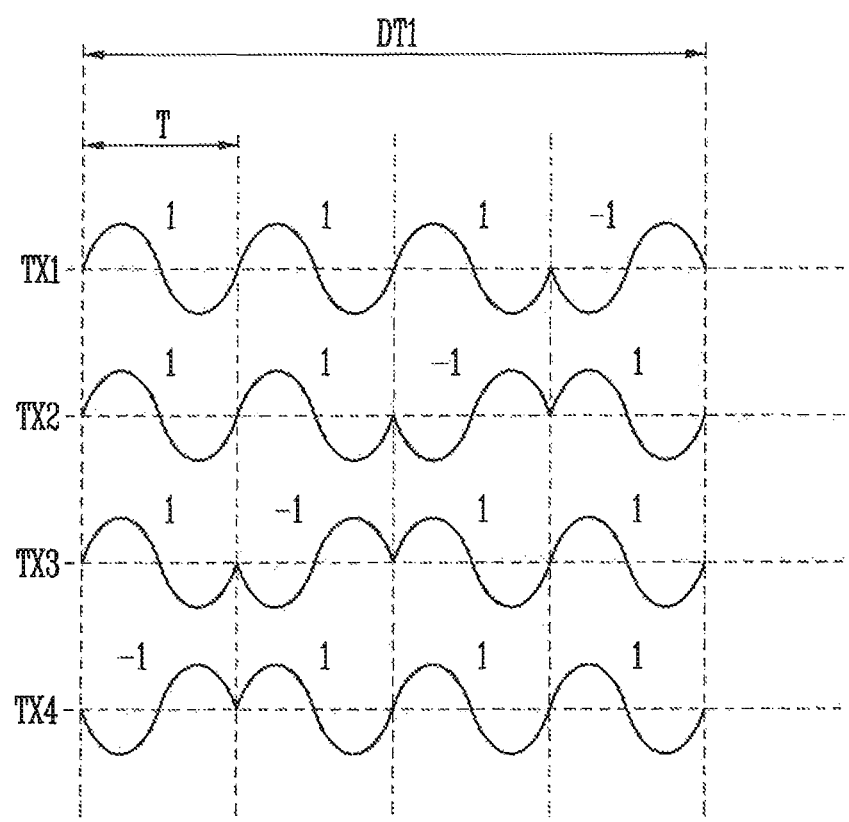
FIG. 9A illustrates a waveform diagram of an example of driving signals supplied to driving electrodes of the touch sensing portion of FIG. 8.
Figure 9B:
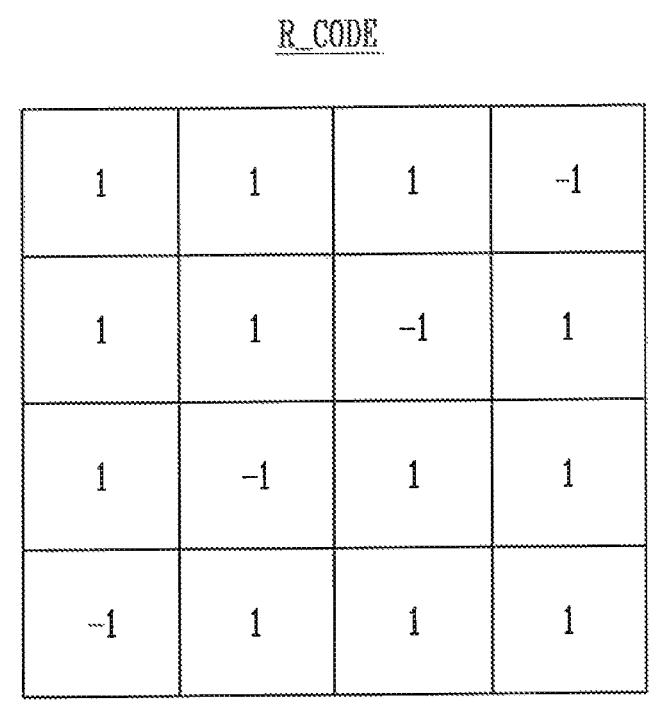
Figure 9C:
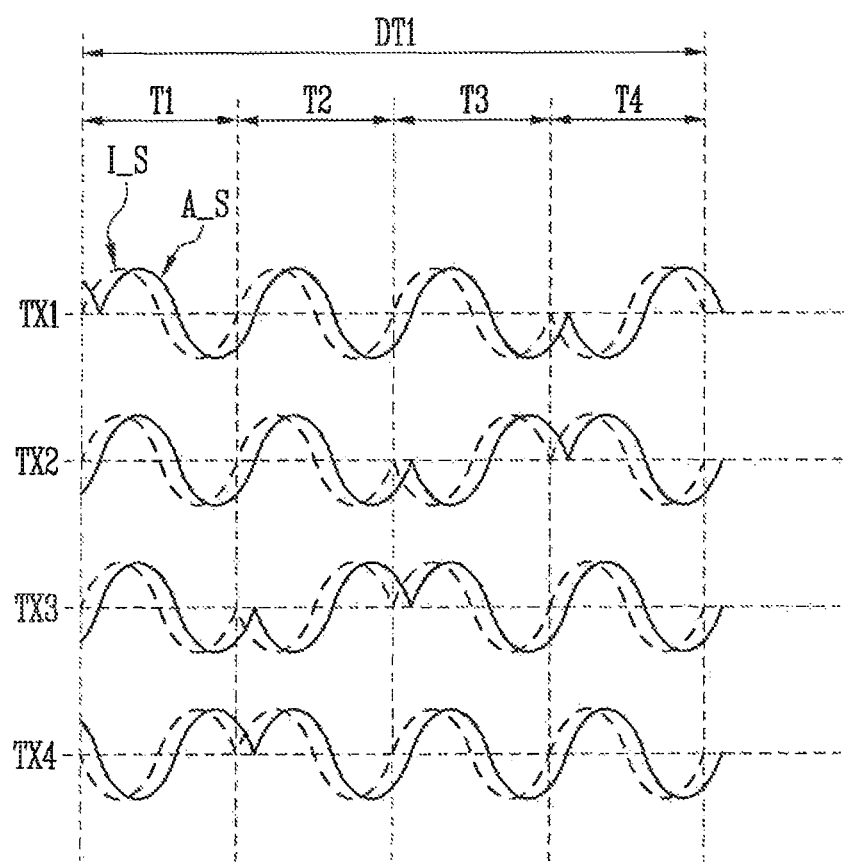
FIG. 9C illustrates an example in which a phase of a sine wave is changed due to a delay of the driving signals of FIG. 9A.

FIG. 8 schematically illustrates an example of a portion of a touch sensing portion included in the touch sensor of FIG. 5. FIG. 9A illustrates a waveform diagram of an example of driving signals supplied to driving electrodes of the touch sensing portion of FIG. 8. FIG. 9B illustrates an example of a reference code corresponding to the driving signals of FIG. 9A. FIG. 9C illustrates an example in which a phase of a sine wave is changed due to a delay of the driving signals of FIG. 9A.

Referring to FIG. 5, FIG. 7, FIG. 8, FIG. 9A, FIG. 9B, and FIG. 9C, the first, second, third and fourth driving signals TX1, TX2, TX3 and TX4 may be supplied in parallel to the first to fourth driving electrodes DE1 to DE4.

In an embodiment of the present invention, the touch detector 100 is driven by a 4-MCD method, and the first to fourth driving electrodes DE1 to DE4 may be referred to as a first group G1. Likewise, the remaining driving electrodes may be grouped and driven for every four consecutive driving electrodes.

As shown in FIG. 8, the first, second, third and fourth capacitances C1, C2, C3 and C4 may be formed by the first to fourth driving electrodes DE1 to DE4 and the first sensing electrode SE1 crossing the first to fourth driving electrodes DE1 to DE4.

As shown in FIG. 9A, the first to fourth driving signals TX1 to TX4, which are sine waves, may be supplied to the first to fourth driving electrodes (DE1 to DE4) in the first driving period DT1, respectively. The phases of the first to fourth driving signals TX1 to TX4 may be determined based on the reference code R_CODE. The first driving period DT1 may be a period in which the touch processor 300 detects the sensing signals received from the sensing electrodes SE1 to SEm as a touch sensing value for a location corresponding to the first to fourth driving electrodes DE1 to DE4.

As shown in FIG. 9B, in an embodiment of the present invention, the reference code R_CODE in the 4-MCD method may include a 4×4 matrix. The component value 1 of the reference code R_CODE may define one cycle T of a first phase sine wave (for example, sin(x)), while the component value −1 of the reference code R_CODE may define one cycle T of a second phase sine wave (for example, −sin(x)). In addition, the reference code R_CODE may have orthogonality.

The number of rows of the reference code R_CODE may correspond to the number of the driving electrodes DE1 to DE4 of the first group G1, while the number of columns of the reference code R_CODE may correspond to the number of times (for example, 4 times) that the cycle of the sine wave is repeated.

Accordingly, the driving period DT1 may correspond to a time when a sine wave is output for 4 cycles by a 4×4 matrix. The first to fourth driving signals TX1 to TX4 output in response to the reference code R_CODE of FIG. 9B may theoretically have a waveform as shown in FIG. 9A.

The sensing signal of the first sensing electrode SE1 generated by the first to fourth driving signals TX1 to TX4 supplied in the first driving period DT1 may be output as a value obtained by amplifying the first to fourth capacitances C1 to C4 through a digital operation using a transpose matrix of the reference code R_CODE.

For this digital operation, the polarity and orthogonality of the reference code should be maintained.

As shown in FIG. 9C, a phase of an actual output waveform A_S (shown by a solid line) of the first to fourth driving signals TX1 to TX4 may be delayed from a phase of an ideal output waveform I_S (shown by a dotted line) due to factors such as the RC delay.

However, within the first driving period DT1, when the phase delay of each of the first to fourth driving signals TX1 to TX4 is $\pi/4$ or less, the polarity of the sine wave in each of the time periods T1 to T4 may be maintained. For example, the polarities of the waveforms of the first driving signal TX1 phase-delayed in the first time period T1, the second time period T2, and the third time period T3 may all correspond to a component value of 1 of the reference code R_CODE, while the polarity of the waveform of the first driving signal TX1 phase-delayed in the fourth time period T4 may correspond to a component value of −1 of the reference code R_CODE.

Accordingly, in the case of the phase delay of FIG. 9C, since the orthogonality of the reference code R_CODE is not broken, it is not necessary to update the reference code R_CODE.

Figure 10A:
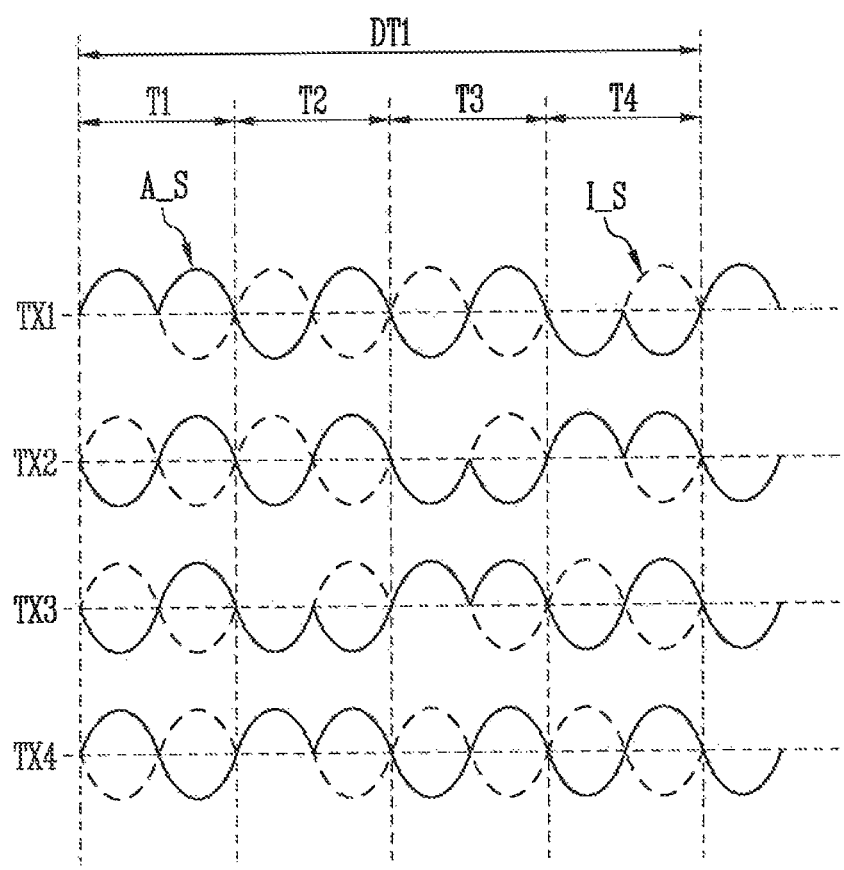
FIG. 10A illustrates an example in which a phase of a sine wave is changed due to a delay of the driving signals of FIG. 9A.
Figure 10B:
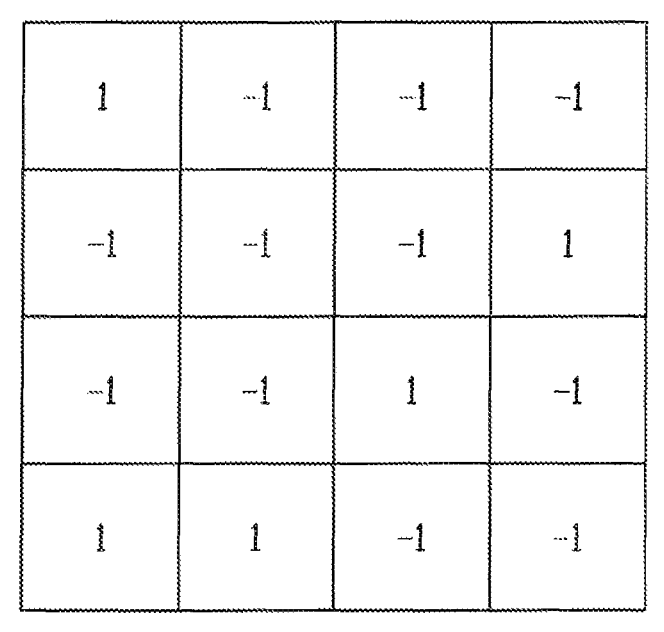

FIG. 10A illustrates an example in which a phase of a sine wave is changed due to a delay of the driving signals of FIG. 9A. FIG. 10B illustrates an example of a reference code changed in response to the driving signals of FIG. 10A.

Referring to FIG. 10A and FIG. 10B, a phase of an actual output waveform A_S (shown by a solid line) of the first to fourth driving signals TX1 to TX4 may be delayed from a phase of an ideal output waveform I_S (shown by a dotted line) due to factors such as the RC delay. In FIG. 10A, the ideal output waveform I_S (shown by a dotted line) may correspond to the reference code R_CODE of FIG. 9B.

FIG. 10A shows an example in which the phases of the first to fourth driving signals TX1 to TX4 are delayed by $\pi$ in the first driving period DT1. In the first driving signal TX1, the positive polarity tends to be dominant in the first time period T1, while the negative polarity tends to dominate in the fourth time period T4. In addition, in the second time period T2 and the third time period T3, the first driving signal TX1 has a second phase waveform. Accordingly, as shown in FIG. 10B, the first row of the actual code corresponding to the output of the first driving signal TX1 may be expressed as [1, −1, −1]. This is different from the reference code R_CODE of FIG. 9B in which the first row is [1, 1, 1, −1].

The phase delay of the first driving signal TX1 and accordingly a change in a code corresponding to the first driving signal TX1 may be referred to as "the polarity of the first driving signal TX1 is changed".

For the second to fourth driving signals TX2 to TX4, the actual code of FIG. 10B may be derived by the above description and analysis. For example, the second row of the actual code corresponding to the second driving signal TX2 may be expressed as [−1, −1, −1, 1], which is different from the reference code R_CODE of FIG. 9B in which the second row is [1, 1, −1, 1]. The actual code of FIG. 10B does not have orthogonality, and thus, a noise component may increase when calculating a touch sensing value.

In other words, when the phase-inverted time in the corresponding time period becomes dominant with respect to the waveform of the polarity defined by the reference code R_CODE, orthogonality may be broken.

To prevent excessive phase delay of the driving signals TX1 to TX4, the orthogonality of the reference code R_CODE may be maintained by updating the reference code R_CODE at each predetermined time point to compensate the waveforms of the driving signals TX1 to TX4.

Figure 11:
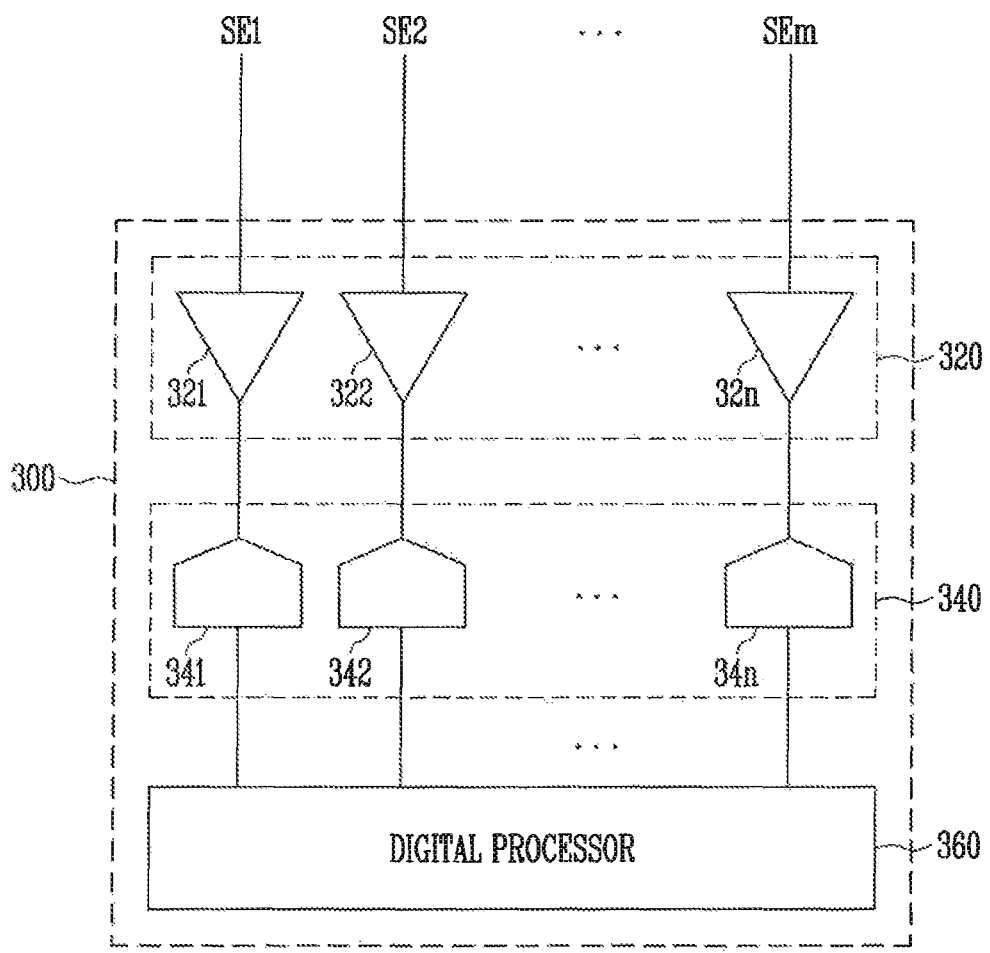
FIG. 11 illustrates a block diagram of an example of a touch processor included in the touch sensor of FIG. 5.

FIG. 11 illustrates a block diagram of an example of a touch processor included in the touch sensor of FIG. 5.

Referring to FIG. 5, FIG. 8, FIG. 9A, FIG. 9B, FIG. 9C, and FIG. 11, the touch processor 300 may include an analog signal processor 320, an analog digital converter 340, and a digital processor 360.

The analog signal processor 320 may generate output signals by removing noise from the sensing signals transmitted from the sensing electrodes SE1 to SEm. In an embodiment of the present invention, the analog signal processor 320 may include analog signal processing circuits 321 to 32n corresponding to respective sensing electrodes SE1 to SEm.

In an embodiment of the present invention, the analog signal processor 320 may include a charge amplifier, a band pass filter, a mixer, and a low pass filter.

In an embodiment of the present invention, the charge amplifier may include a differential amplifier that outputs two differential signals by differentiating sensing signals supplied from two adjacent sensing electrodes. In an embodiment of the present invention, the charge amplifier may include a differential amplifier that outputs two differential signals by differentiating a sensing signal supplied from a sensing electrode connected thereto and a reference signal supplied from a reference power source. In an embodiment of the present invention, the charge amplifier may include a single-ended charge amplifier that amplifies and outputs a sensing signal supplied from a sensing electrode connected thereto.

However, this is an example, and the configuration of the charge amplifier is not limited thereto.

The band pass filter may filter only a specific frequency band signal from the signal output from the charge amplifier and output the filtered signal.

The mixer may change a frequency of the signal filtered by the band pass filter. For example, the mixer may frequency-convert a sensing signal component of a relatively low frequency band into a low frequency band, and may frequency-convert noise of a relatively low frequency band into a high frequency band.

The low pass filter may filter high-frequency noise from the signal output from the mixer, and may output the final output signal to the analog digital converter 340.

As described above, the analog signal processor 320 may remove noise so that only the original signal modulated based on the driving signals may be restored by using the charge amplifier, the band pass filter, the mixer, and the low pass filter.

However, this is an example, and the configuration of the analog signal processor 320 performing the above-described function is not limited thereto.

The analog digital converter 340 may convert the applied analog signals into digital sensing signals, and may provide the digital sensing signals to the digital processor 360. The analog digital converter 340 may include analog digital conversion circuits 341 to 34n corresponding to respective sensing electrodes SE1 to SEm.

The digital processor 360 may calculate sensed values of capacitances sensed at a corresponding position by applying digital sensing signals to an inverse matrix of the reference code R_CODE corresponding to a corresponding group of the driving electrodes. For example, the sensed values may be calculated through a matrix operation relationship of [Equation 1] and [Equation 2] below.

$$H^T \times C = K \quad \text{[Equation 1]}$$

$$C = (H^T)^{-1} \times K \quad \text{[Equation 2]}$$

Wherein $H^T$ is a transpose matrix of the reference code R_CODE, C is a value of capacitance of a position to be extracted by the touch sensing portion 100, and K is a digital sensing signal.

For example, the first to fourth capacitances C1 to C4 of FIG. 8 may be set to C in [Equation 1]. The first to fourth capacitances C1 to C4 may be calculated from a product of an inverse matrix of a transpose matrix of the reference code R_CODE, which is a 4×4 matrix, and a digital sensing signal (for example, including K=(K1, K2, K3, K4)) that a sensing signal received from the first sensing electrode SE1 is converted.

A capacitance value corresponding to a location other than a location where a capacitance change is sensed by a touch due to the orthogonality of the reference code R_CODE may be output as 0.

Referring to FIG. 8, it may be understood that the first to fourth capacitances C1 to C4 corresponding to the first sensing electrode SE1 are calculated, but capacitances corresponding to a plurality of sensing electrodes may be simultaneously output. For example, the capacitance value C is extracted in a form of a 4 by i matrix, which may be capacitance values of locations according to i sensing electrodes intersecting a current group of driving electrodes for which capacitance is to be calculated.

Additionally, a scalar product may be applied to both sides of [Equation 2], and the capacitance value C may be amplified and output by applying the scalar product.

Figure 12:
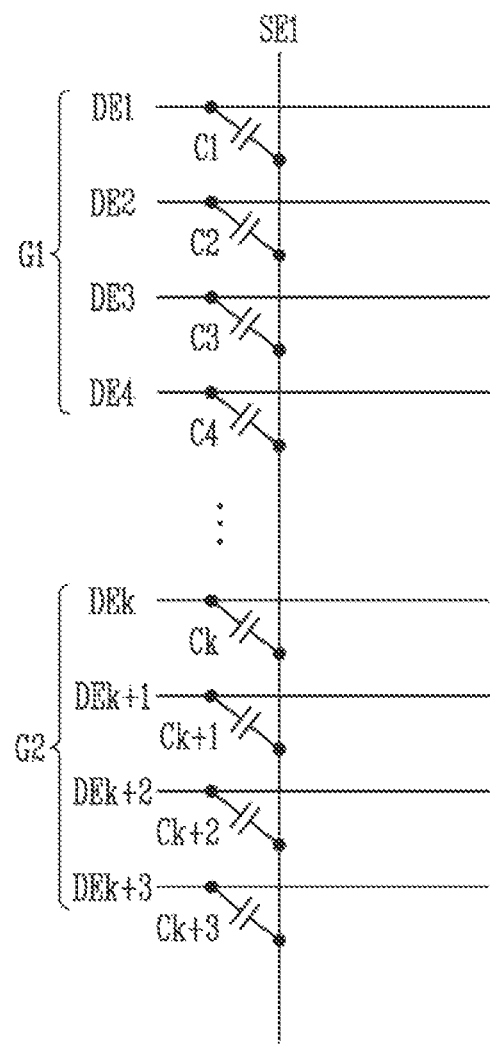
FIG. 12 schematically illustrates an example of a portion of a touch sensing portion included in the touch sensor of FIG. 5.
Figure 13:
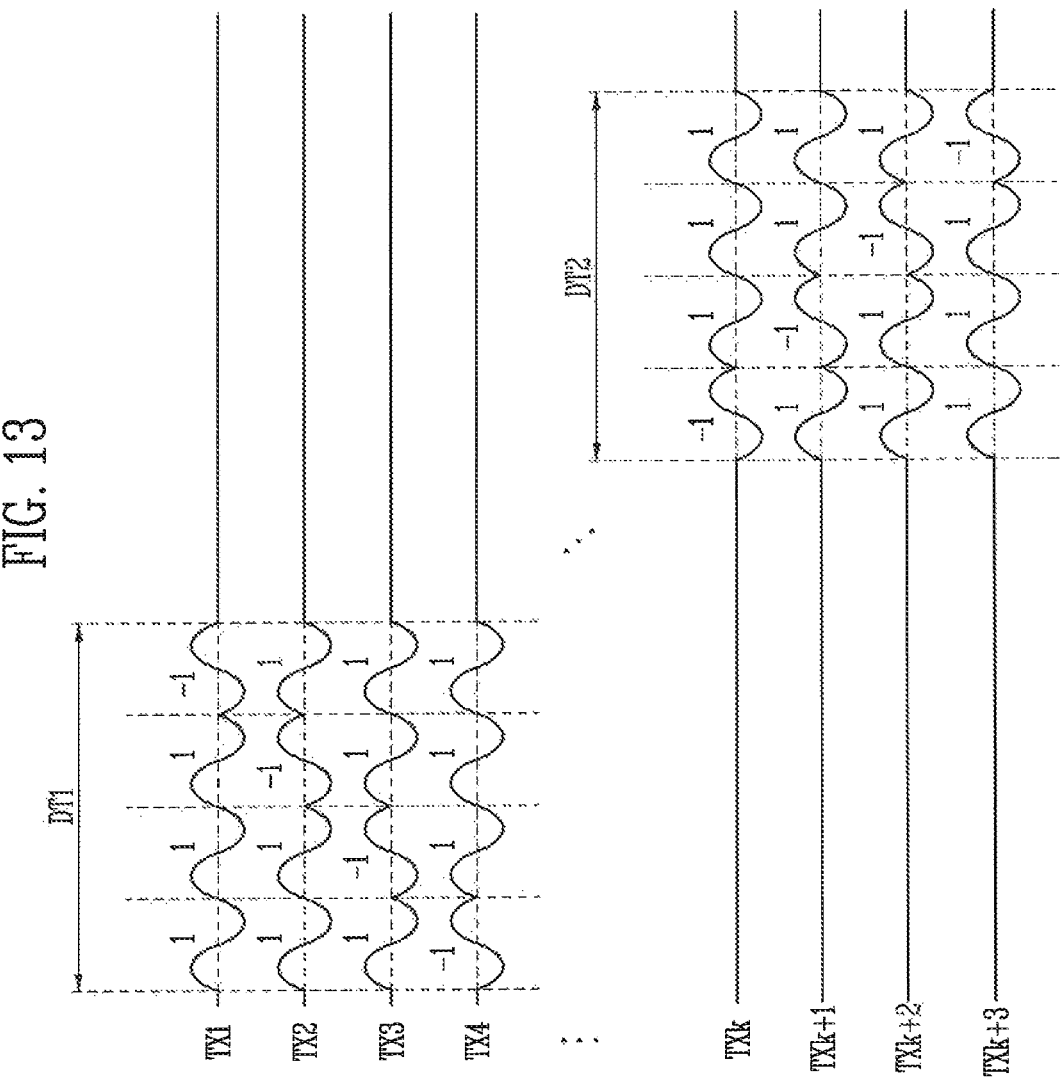
FIG. 13 illustrates a waveform diagram of an example of driving signals supplied to driving electrodes of the touch sensing portion of FIG. 12.

FIG. 12 schematically illustrates an example of a portion of a touch sensing portion included in the touch sensor of FIG. 5. FIG. 13 illustrates a waveform diagram of an example of driving signals supplied to driving electrodes of the touch sensing portion of FIG. 12.

Referring to FIG. 5, FIG. 12, and FIG. 13, the first to fourth driving signals TX1 to TX4 may be supplied in parallel to the first to fourth driving electrodes DE1 to DE4, and k-th to (k+3)-th driving signals TXk to TXk+3 may be supplied in parallel to k-th to (k+3)-th driving electrodes DEk to DEk+3 (wherein k is 4i+1 (i is a natural number)).

FIG. 13 shows an ideal sine wave waveform in which no RC delay is reflected. However, an actual RC delay may occur at a level that does not break the orthogonality of the reference code R_CODE. For example, the actual phase delay of the sine wave in each of the first and second driving periods DT1 and DT2 may be at a level of $\pi/4$ or less.

The touch sensing portion 100 may be driven by a 4-MCD method. In this case, the first to fourth driving electrodes DE1 to DE4 may be referred to as a first group G1, and the k-th to (k+3)-th driving electrodes DEk to DEk+3 may be referred to as a second group G2.

A sensing signal including the first to fourth capacitances C1 to C4 based on the first to fourth driving signals TX1 to TX4 provided in the first driving period DT1 may be output through the first sensing electrode SE1. The touch processor 300 may modulate and demodulate the sensing signal to extract (e.g., calculate) values of the first to fourth capacitances C1 to C4, respectively.

A sensing signal including k-th to (k+3)-th capacitances Ck to Ck+3 based on the k-th to (k+3)-th driving signals TXk to TXk+3 provided in the second driving period DT2 may be output through the first sensing electrode SE1. The touch processor 300 may modulate and demodulate the sensing signal to extract (e.g., calculate) values of the k-th to (k+3)-th capacitances Ck to Ck+3, respectively.

FIG. 12 and FIG. 13 show that the capacitances corresponding to the first sensing electrode SE1 are detected, but the present invention is not limited thereto. For example, capacitances of locations corresponding to a plurality of sensing electrodes may be respectively calculated through calculations on the sensing signals.

As described above, the RC delays of the driving signals TX1 to TXk+3 may be different. For example, when the driving signals of the same reference code R_CODE are supplied to the first group G1 and the second group G2, since equivalent impedances of the driving electrodes TX1 to TX4 and TXk to TXk+3 are different, the orthogonality of the reference code R_CODE of the first to fourth driving signals TX1 to TX4 or the k-th to (k+3)-th driving signals TXk to TXk+3 may be broken.

Accordingly, the reference code R_CODE may be updated in the second driving period DT2 for detecting the capacitance for the second group G2. In other words, as shown in FIG. 13, the reference code R_CODE corresponding to the first driving period DT1 and the reference code R_CODE corresponding to the second driving period DT2 may be different. For example, the reference code R_CODE corresponding to the first driving signal TX1 may be [1, 1, 1, −1] and the reference code R_CODE corresponding to the k-th driving signal TXk may be [−1, 1, 1,]. Accordingly, the waveform of the first driving signal TX1 in the first driving period DT1 and the waveform of the k-th driving signal TXk in the second driving period DT2 may be different.

However, in each of the first and second driving periods DT1 and DT2, the phase delays of the actual driving signals may be allowed because a phase delay of $\pi/4$ or less does not break the orthogonality.

As described above, the touch sensor TS according to the embodiments of the present invention may sense a touch at a high speed through a multi-channel driving (MCD) method using a sine wave. In addition, the touch sensor TS, to satisfy the orthogonality of the reference code defining a polarity of a sine wave, may update (e.g., refresh) the reference code corresponding thereto and the driving signals at each time point when the phase delay exceeding $\pi/4$ is predicted. Accordingly, the phase delay of the driving signals is previously compensated (e.g., pre-compensated), and the capacitance for each location of the touch sensing portion 100 demodulated (or extracted) from the sensed signal by the orthogonality of the reference code may be accurately detected.

Particularly, the touch sensor TS according to the embodiments of the present invention may have a characteristic that is robust to the influence of the RC delay. Accordingly, a high level of touch sensing speed and accuracy may be ensured even in a large-sized (or heavy load) touch environment.

FIG. 14 illustrates an example of orthogonal codes stored in a storage portion included in the touch sensor of FIG. 5.

Referring to FIG. 5, FIG. 9A, and FIG. 14, the storage 230 may store a plurality of orthogonal codes corresponding to multi-channel driving. For example, in the case of a 4-MCD method in which the touch detection is performed in units of four driving electrodes, the storage 230 may include orthogonal codes corresponding to an 4×4 matrix.

The value of each component of the reference code R_CODE may include 1 or −1. The component value 1 of the reference code R_CODE may define a cycle T of a first phase sine wave (for example, sin(x)), while the component value −1 of the reference code R_CODE may define a cycle T of a second phase sine wave (for example, −sin(x)). In addition, the reference code R_CODE may have orthogonality.

As shown in FIG. 14, the matrix satisfying the orthogonality in the 4×4 matrix may include a total of nine orthogonal codes CODE1, CODE2, CODE3, CODE4, CODE5, CODE6, CODE7, CODE8 and CODE9. In other words, the storage 230 may include information on first, second, third, fourth, fifth, sixth, seventh, eighth and ninth orthogonal codes CODE1 to CODE9. One selected from the first to ninth orthogonal codes CODE1 to CODE9 may be loaded as the reference code R_CODE.

The driving signals may be output in parallel as a waveform corresponding to the reference code R_CODE selected in a unit of a predetermined group. Accordingly, the reference code R_CODE may have orthogonality.

Figure 15:
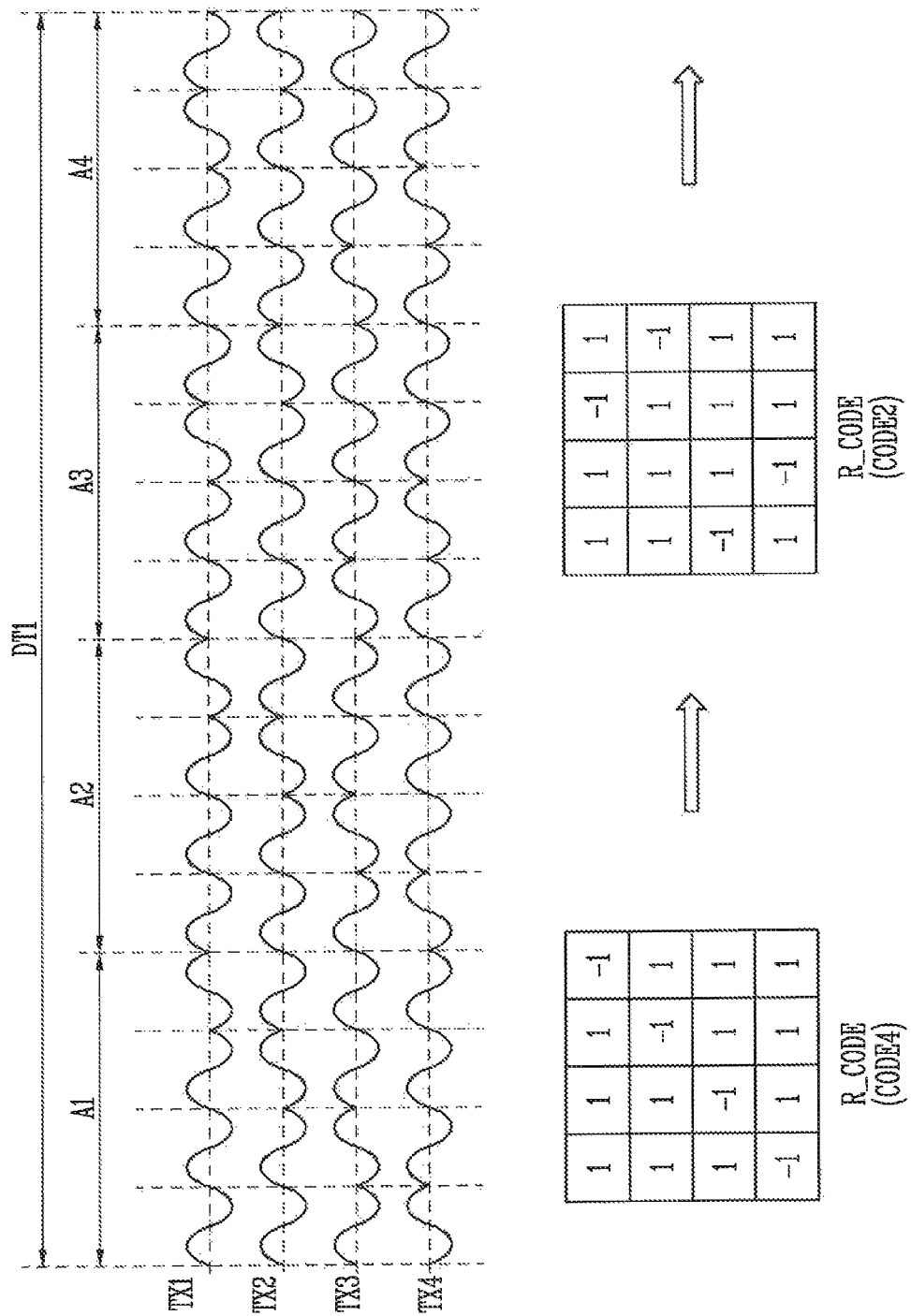
FIG. 15 illustrates an example of changing a waveform of driving signals by updating a reference code within a first driving period.

FIG. 15 illustrates an example of changing a waveform of the driving signals by updating the reference code within the first driving period.

Referring to FIG. 5, FIG. 8, FIG. 14, and FIG. 15, the first to fourth driving signals TX1 to TX4 may be supplied in parallel to the first to fourth driving electrodes DE1 to DE4 in the first driving period DT1.

In an embodiment of the present invention, the first driving period DT1 may include first to fourth unit periods A1 to A4 in which the first to fourth driving signals TX1 to TX4 corresponding to the reference code R_CODE are output.

FIG. 15 shows an ideal sine wave waveform in which no RC delay is reflected. However, an actual RC delay may occur at a level that does not break the orthogonality of the reference code R_CODE. For example, the actual phase delay of the sine wave in each of the first to fourth unit periods A1 to A4 may be at a level of $\pi/4$ or less.

In the case of the conventional driving signal output method in which no reference code is updated, the polarity of at least one of the first to fourth driving signals TX1 to TX4 may be changed due to the accumulation of the phase delay over time. When the polarity of at least one of the first to fourth driving signals TX1 to TX4 is changed, the probability of orthogonality being broken increases.

For example, experimentally, the orthogonality of the reference code R_CODE may be broken from the third unit period A3 due to the accumulation of the RC delay, and to prevent the orthogonality from being broken, the reference code R_CODE may be updated corresponding to the third unit period A3. In other words, the sine wave waveform of the first to fourth driving signals TX1 to TX4 supplied in the third unit period A3 may be changed to the updated reference code R_CODE.

For example, the first to fourth driving signals TX1 to TX4 corresponding to the fourth orthogonal code CODE4 (see FIG. 14) are supplied in the first unit period A1 and the second unit period A2. The first to fourth driving signals TX1 to TX4 corresponding to the second orthogonal code CODE2 (see FIG. 14) may be supplied in the third unit period A3 and the fourth unit period A4.

Accordingly, the phase delay of the driving signals is previously compensated, and the capacitance for each location of the touch sensing portion 100 demodulated (or extracted) from the sensed signal by the orthogonality of the reference code may be accurately detected.

FIG. 16 illustrates an example of the reference code applied to driving of the touch sensor of FIG. 5.

Referring to FIG. 5 and FIG. 16, the touch sensor TS may be driven by an 8-MCD method in which the touch detection is performed in units of eight driving electrodes. Accordingly, the reference code R_CODE may be defined as an 8×8 matrix.

The reference code R_CODE defining the phase (or polarity) of the sine wave waveform may be defined to have orthogonality. The reference code R_CODE may be defined as a combination of four 4×4 matrices. For example, the reference code R_CODE may be formed by a combination of matrix M having orthogonality.

As shown in FIG. 16, when the reference code R_CODE is divided into four quadrants, the first quadrant, the second quadrant, and the third quadrant may each have a component of matrix M, and the fourth quadrant may have a component of matrix −M.

The reference code R_CODE of the 8×8 matrix determined as described above may have orthogonality.

The touch sensor TS may also be driven by a 16-MCD method in which the touch detection is performed in units of 16 driving electrodes. In this case, the reference code R_CODE may be defined as an 16×16 matrix. The 16×16 matrix is defined as a combination of four 8×8 matrices and has orthogonality.

The method of defining the 16×16 matrix may be substantially the same as the method described with reference to FIG. 16. For example, the first quadrant, the second quadrant, and the third quadrant of the reference code of the 16×16 matrix may each have a component of the reference code R_CODE of FIG. 16, and the fourth quadrant may have a second phase value of the reference code R_CODE of FIG. 16.

As described above, the driving of the touch sensor by a code-division multiplexing method driven based on the noise-resistant reference code R_CODE may include an 8-MCD method, a 16-MCD method, and the like. Accordingly, the touch sensing speed in the large-area display device may be further increased.

Figure 17:
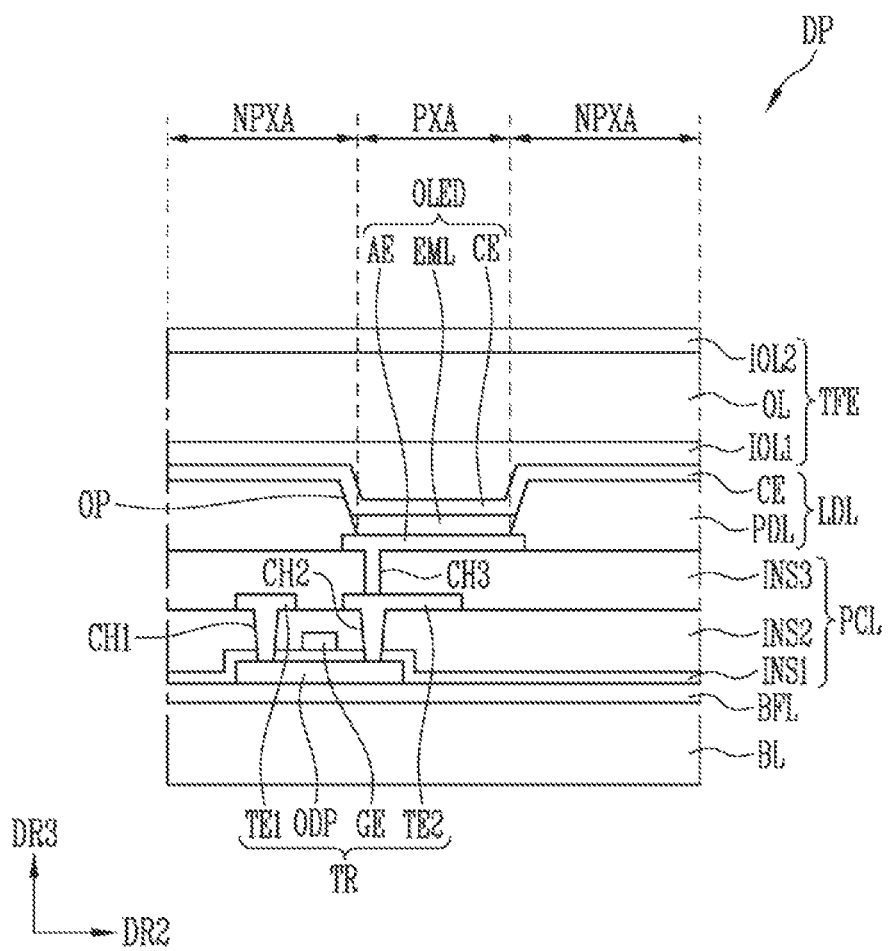
FIG. 17 illustrates a cross-sectional view of an example of a display panel included in the display device of FIG. 1A.

FIG. 17 illustrates a cross-sectional view of an example of a display panel included in the display device of FIG. 1A.

Referring to FIG. 17, the display panel DP of the display device DD includes a base layer BL (or substrate), a buffer layer BFL, a pixel circuit layer PCL, a light emitting element layer LDL, and an encapsulation layer TFE.

The base layer BL may include a synthetic resin film. The synthetic resin layer may be a polyimide resin layer, and the material thereof is not particularly limited. In addition, the base layer BL may include a glass substrate, a metal substrate, or an organic/inorganic composite material substrate.

The buffer layer BFL may be provided on the base layer BL. The buffer layer BFL may prevent impurities from being diffused into a transistor TR provided on the base layer BL and may improve flatness of the base layer BL. The buffer layer BFL may be provided as a single layer, but may also be provided as a multilayer of at least two layers or more. The buffer layer BFL may be an inorganic insulating film made of an inorganic material. For example, the buffer layer BFL may be formed of a silicon nitride, a silicon oxide, a silicon oxynitride, or the like. When the buffer layer BFL is provided as the multilayer, respective layers may be made of the same material or different materials. In some embodiments of the present invention, the buffer layer BFL may be omitted.

The pixel circuit layer PCL may include at least one insulating layer and circuit elements. The insulating layer may include at least one inorganic film and at least one organic film. The circuit element may include a signal line, a driving circuit of a pixel, and the like.

A semiconductor pattern ODP of a transistor TR may be disposed on the buffer layer BFL. The semiconductor pattern ODP may be selected from amorphous silicon, polysilicon, or a metal oxide semiconductor.

A first insulating layer INS1 may be disposed on the semiconductor pattern ODP. The first insulating layer INS1 may be an inorganic insulating film made of an inorganic material. For example, the first insulating layer INS1 may be formed of a silicon nitride, a silicon oxide, a silicon oxynitride, or the like.

A gate electrode GE (or control electrode) of the transistor TR may be disposed on the first insulating layer INS1. The gate electrode GE may be manufactured according to the same photolithography process with scan lines (GL in FIG. 18).

A second insulating layer INS2 covering the gate electrode GE may be disposed on the first insulating layer INS1. The second insulating layer INS2 may be an inorganic insulating film made of an inorganic material. For example, the second insulating layer INS2 may be formed of a silicon nitride, a silicon oxide, a silicon oxynitride, or the like.

A first transistor electrode TE1 (or source electrode) and a second transistor electrode TE2 (or drain electrode) of the transistor TR may be disposed on the second insulating layer INS2.

The first transistor electrode TE1 and the second transistor electrode TE2 may be connected to the semiconductor pattern ODP through a first penetrating hole CH1 and a second penetrating hole CH2 penetrating through the first insulating layer INS1 and the second insulating layer INS2, respectively. In another embodiment of the present invention, the transistor TR may be changed to have a bottom gate structure.

A third insulating layer INS3 covering the first transistor electrode TE1 and the second transistor electrode TE2 may be disposed on the second insulating layer INS2. The third insulating layer INS3 may provide a flat surface. The third insulating layer INS3 may be formed as an organic film including an acryl resin, an epoxy resin, a phenolic resin, a polyamide resin, a polyimide resin, and the like.

The light emitting element layer LDL is disposed on the third insulating layer INS3. The light emitting element layer LDL may include a pixel defining film PDL and a light emitting element OLED.

The pixel defining film PDL may include an organic material. A first electrode AE may be disposed on the third insulating layer INS3. The first electrode AE may be connected to the second transistor electrode TE2 through a third penetrating hole CH3 penetrating through the third insulating layer INS3. In other words, the first electrode AE may be connected to the drain electrode of the transistor TR. The pixel defining film PDL may include an opening OP, and the opening OP may define a light emitting area PXA. The opening OP of the pixel defining film PDL may expose at least a portion of the first electrode AE. As an example, the pixel defining film PDL may be omitted.

The pixel PX may be disposed in the display area DD-DA. The display area DD-DA may include the light emitting area PXA and a non-light emitting area NPXA adjacent to the light emitting area PXA. The non-light emitting area NPXA may surround the light emitting area PXA. The light emitting area PXA may correspond to a partial area of the first electrode AE exposed by the opening OP. The non-light emitting area NPXA may correspond to the pixel defining film PDL.

The light emitting element OLED may include the first electrode AE connected to the second transistor electrode TE2, an emission layer EML disposed on the first electrode AE, and a second electrode CE disposed on the emission layer EML. For example, the light emitting element OLED may be an organic light emitting diode.

One of the first electrode AE and the second electrode CE may be an anode electrode, and the other of the first electrode AE and the second electrode CE may be a cathode electrode. For example, the first electrode AE may be an anode electrode, and the second electrode CE may be a cathode electrode.

At least one of the first electrode AE and the second electrode CE may be a transmissive electrode. For example, when the display element OLED is a rear light emitting type of organic light emitting element, the first electrode AE may be a transmissive electrode, and the second electrode CE may be a reflective electrode. When the display element OLED is a front light emitting type of organic light emitting element, the first electrode AE may be a reflective electrode, and the second electrode CE may be a transmissive electrode. When the display element OLED is a double-sided light emitting type of organic light emitting element, both the first electrode AE and the second electrode CE may be a transmissive electrode. In the present embodiment, a case in which the display element OLED is a front light emitting type of organic light emitting element in which the first electrode AE is an anode electrode and the second electrode CE is a cathode electrode will be described as an example.

In each pixel area, the first electrode AE may be disposed on the third insulating layer INS3. The first electrode AE may include a reflective film capable of reflecting light, and a transparent conductive film disposed at an upper or lower portion of the reflective film. At least one of the transparent conductive film and the reflective film may be connected to the second transistor electrode TE2.

The reflective film may include a material capable of reflecting light. For example, the reflective film may include at least one of aluminum (Al), silver (Ag), chromium (Cr), molybdenum (Mo), platinum (Pt), nickel (Ni), and an alloy thereof.

The transparent conductive film may include a transparent conductive oxide. For example, the transparent conductive film may include at least one transparent conductive oxide of an indium tin oxide (ITO), an indium zinc oxide (IZO), an aluminum zinc oxide (AZO), a gallium doped zinc oxide (GZO), a zinc tin oxide (ZTO), a gallium tin oxide (GTO), and a fluorine doped tin oxide (FTO).

The emission layer EML may be disposed on an exposed surface of the first electrode AE. The emission layer EML may have a multi-layered thin film structure including at least a light generation layer (LGL). For example, the emission layer EML may include a hole injection layer (HIL) for injecting holes, a hole transport layer (HTL) for increasing recombination between holes and electrons by having excellent hole transport and blocking movement of electrons that are not be combined in a light generation layer, a light generation layer that emits light by recombination of injected electrons and holes, a hole blocking layer (HBL) for blocking movement of holes that are not to be combined in a light generation layer, an electron transport layer (ETL) for smoothly transporting electrons to the light generation layer, and an electron injection layer (EIL) for injecting electrons.

A color of light generated by the light generation layer may be one of red, green, blue, and white, but is not limited thereto. For example, the color of light generated by the light generation layer of the emission layer EML may be one of magenta, cyan, and yellow.

The hole injection layer, the hole transport layer, the hole blocking layer, the electron transport layer, and the electron injection layer may be a common film connected in pixel areas adjacent to each other.

The second electrode CE may be disposed on the emission layer EML. The second electrode CE may be a transflective film. For example, the second electrode CE may be a thin metal layer having a thickness sufficient to transmit light. The second electrode CE may transmit a portion of the light generated in the light generation layer and reflect the remainder of the light generated in the light generation layer.

The second electrode CE may include a material having a lower work function than that of the transparent conductive film. For example, the second electrode CE may include at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), and an alloy thereof.

Some of the light emitted from the emission layer EML does not transmit through the second electrode CE, and the light reflected from the second electrode CE may be reflected again from a reflective film. For example, the light emitted from the emission layer EML may resonate between the reflective film and the second electrode CE. A light extraction efficiency of the display element OLED may be increased by the resonance of light.

A distance between the reflective film and the second electrode CE may be varied according to the color of light generated in the light generation layer. In other words, according to the color of light generated in the light generation layer, the distance between the reflective film and the second electrode CE may be adjusted to match a resonance distance.

The encapsulation layer TFE may be disposed on the second electrode CE. The encapsulation layer TFE is commonly disposed on the pixels PX. The encapsulation layer TFE may directly cover the second electrode CE. In an embodiment of the present invention, a capping layer covering the second electrode CE may be further disposed between the encapsulation layer TFE and the second electrode CE. In this case, the encapsulation layer TFE may directly cover the capping layer.

The encapsulation layer TEE may include a first encapsulation inorganic film IOL1, an encapsulation organic film OL, and a second encapsulation inorganic film IOL2 that are sequentially stacked on the second electrode CE. The first or second encapsulating inorganic IOL1 or IOL2 film may be made of an inorganic insulating material such as a polysiloxane, a silicon nitride, a silicon oxide, and a silicon oxynitride. The encapsulation organic film OL may be made of an organic insulating material such as a polyacryl-based compound, a polyimide-based compound, a fluorine-based carbon compound such as Teflon, and a benzocyclobutene compound.

In an embodiment of the present invention, the above-described touch sensor layer (for example, TSL of FIG. 2A) may be disposed on the encapsulation layer TFE.

FIG. 18 illustrates a plan view of an example of a display panel included in the display device of FIG. 1A.

Referring to FIG. 18, the display panel DP may include the display area DD-DA in which an image is displayed and the non-display area DD-NDA adjacent to the display area DD-DA. The non-display area DD-NDA is an area in which no image is displayed. The non-display area DD-NDA may be disposed outside the display area DD-DA.

The display area DD-DA may include pixel areas provided with the pixels PX. A pad portion PD provided with pads of wires may be provided in the non-display area DD-NDA. A data driver that provides a data signal to the pixels PX may be provided in the non-display area DD-NDA. The data driver may provide a data signal to each of the pixels PX through data lines. The data driver may be included in a timing control circuit TC to be described later.

The display panel DP may include a driving circuit GDC, signal lines SGL, the pad portion PD, and the pixels PX.

The pixels PX may be disposed in the display area DD-DA. Each of the pixels PX may include a light emitting element and a pixel driving circuit connected to the light emitting element. For example, the light emitting element may be an organic light emitting diode or an inorganic light emitting diode such as a micro light emitting diode (LED) and a quantum dot light emitting diode. In addition, the light emitting element may be a light emitting element made of organic and inorganic materials. Furthermore, each of the pixels PX may include a single light emitting element, or in another embodiment of the present invention, each of the pixels PX may include a plurality of light emitting elements. The plurality of light emitting elements may be connected in series, in parallel, or in series/parallel to each other.

The driving circuit GDC may include a scanning driving circuit. The scanning driving circuit may generate scan signals, and may sequentially provide or output the scan signals to scan lines GL. The scanning driving circuit may further provide another control signal to the driving circuit of the pixels PX.

The scan driving circuit may include thin film transistors formed through the same process as the driving circuit of the pixels PX, for example, a low temperature polycrystalline silicon (LTPS) process or a low temperature polycrystalline oxide (LTPO) process.

The signal lines SGL may include the scan lines GL, data lines DL, power lines FL, and control signal lines CSL. Each of the scan lines GL may be connected to a corresponding pixel among the pixels PX, and each of the data lines DL may be connected to a corresponding pixel among the pixels PX. The power line PL may be connected to the pixels PX. The control signal line CSL may provide control signals to the scanning driving circuit.

The signal lines SGL may overlap the display area DD-DA and the non-display area DD-NDA. The signal lines SGL may include a pad portion and a line portion. The line portion of the signal lines SGL may overlap the display area DD-DA and the non-display area DD-NDA. The pad portion of the signal lines SGL may be connected to an end of the line portion. The pad portion of the signal lines SGL may be disposed in the non-display area DD-NDA, and may overlap a corresponding signal pad among the signal pads DP-PD. An area in which the signal pads DP-PD are disposed among the non-display area DD-NDA may be referred to as a pad area NDA-PD.

The line part connected to the pixels PX may configure most of the signal lines SGL. The line portion of the signal lines SGL may be connected to transistors of the pixels PX. The line portion of the signal lines SGL may have a single-layered/multi-layered structure, and the line portion of the signal lines SGL may have a single body, or may include two or more parts. The two or more parts may be disposed on different layers, and may be connected to each other through a contact hole penetrating a disposed insulating layer between the two or more parts.

The display panel DP may further include dummy pads IS-DPD disposed in the pad area NDA-PD. Since the dummy pads IS-DPD are formed through the same process as the signal lines SGL, they may be disposed on the same layer as the signal lines SGL. The dummy pads IS-DPD may be selectively provided in the display device DD including the touch sensor.

FIG. 18 further shows a circuit board PCB electrically connected to the display panel DP. The circuit board PCB may be a flexible circuit board or a rigid circuit board. The circuit board PCB may be directly coupled to the display panel DP, or may be connected to the display panel DP through another circuit board.

The timing control circuit TC that controls an operation of the display panel DP may be disposed on the circuit board PCB. The timing control circuit TC may receive input image data and timing signals (for example, a vertical synchronization signal, a horizontal synchronization signal, clock signals) from the outside (for example, a host system such as an application processor), may generate a gate driving control signal for controlling the driving circuit GDC based on the timing signals, and may provide the gate driving control signal to the driving circuit GDC. Here, the vertical synchronization signal among the timing signals may define a start of one display section (or one frame) in which an image (or frame image) of one frame is displayed, or a start of image data corresponding to one frame (or transmission start), and the horizontal synchronization signal among the timing signals may define a section in which each (for example, an image through pixels included in the same row) of images of a horizontal line included in an image of one frame is output. In addition, the timing control circuit TC may generate a data driving control signal for controlling the data driver, provide the data driving control signal to the data driver, and rearrange input image data to provide the data driver. In an embodiment of the present invention, at least some of the functions of the data driver may be included in the timing control circuit TC.

In addition, an input sensing circuit IS-C (or a touch driver) may be disposed on the circuit board PCB.

Each of the timing control circuit TC and the input sensing circuit IS-C may be mounted on the circuit board PCB in a form of an integrated chip. As another example, the timing control circuit TC and the input sensing circuit IS-C may be mounted on the circuit board PCB in a form of one integrated chip. The circuit board PCB may include circuit board pads PCB-P electrically connected to the display panel DR The circuit board PCB may further include signal lines connecting the circuit board pads PCB-P, the timing control circuit TC, and/or the input sensing circuit IS-C.

While this invention has been described in connection with example embodiments thereof, it is to be understood that the invention is not limited to the disclosed embodiments, but, on the contrary, is intended to cover various modifications and equivalent arrangements included within the spirit and scope of the appended claims.

What is claimed is:

1. A touch sensor, comprising:
 a touch sensing area including driving electrodes and sensing electrodes;
 a driving signal generator which determines phases of driving signals based on a reference code and supplies the driving signals to the sensing electrodes, wherein the driving signals are sine waves; and
 a touch processor which receives sensing signals according to the driving signals from the sensing electrodes and determines a touch position based on the sensing signals and the reference code,
 wherein the driving signal generator controls the phases of the driving signals by updating the reference code at a predetermined time point, and
 wherein the time point is determined so that a maximum phase delay of the driving signals to the time point is less than $\pi/4$.

2. The touch sensor of claim 1, wherein the driving signal generator supplies the driving signals in parallel to driving electrodes included in a first group of the driving electrodes during a first driving period.

3. The touch sensor of claim 2, wherein at least one phase of the driving signals supplied to the first group in a period corresponding to a cycle of the sine wave in the first driving period is opposite to phases of the rest of the driving signals supplied to the first group in the period.

4. The touch sensor of claim 3, wherein the reference code includes a matrix of 1 values and −1 values, and
 the value 1 and the value −1 correspond to sine waves having opposite polarities.

5. The touch sensor of claim 4, wherein the reference code is an orthogonal code.

6. The touch sensor of claim 5, wherein the number of rows of the matrix corresponds to the number of the driving electrodes in the first group, and
 the number of columns of the matrix corresponds to the number of times the cycle of the sine wave is repeated.

7. The touch sensor of claim 2, wherein the driving signal generator comprises:
 a sine wave generator which generates sine wave signals; and
 a code generator which outputs a first phase or an inverse phase of the first phase of each of the sine wave signals supplied from the sine wave generator in response to the reference code as the driving signals.

8. The touch sensor of claim 7, wherein the driving signal generator further comprises:
 a storage which stores a plurality of orthogonal codes, and
 the code generator selects one of the orthogonal codes as the reference code at the predetermined time point.

9. The touch sensor of claim 8, wherein the driving signal generator supplies the driving signals in parallel to driving electrodes included in a second group of the driving electrodes during a second driving period.

10. The touch sensor of claim 9, wherein a waveform of a first driving signal supplied to a first driving electrode of the first group during the first driving period is different from a waveform of a second driving signal supplied to a first driving electrode of the second group during the second driving period.

11. The touch sensor of claim 7, wherein the first driving period includes a plurality of unit periods in which the driving signals corresponding to the reference code are supplied to the first group.

12. The touch sensor of claim 11, wherein the driving signals corresponding to a first reference code are output in at least one of the unit periods of the first driving period, and the driving signals corresponding to a second reference code are output in at least another one of the unit periods of the first driving period.

13. The touch sensor of claim 2, wherein the touch processor comprises:
an analog signal processor which generates output signals by removing noise from the sensing signals;
an analog digital converter which converts the output signals to digital sensing signals; and
a digital processor which calculates sensed capacitances by demodulating the digital sensing signals using the reference code.

14. A display device, comprising:
a display panel including pixels;
a touch sensing area disposed on the display panel and including driving electrodes and sensing electrodes;
a driving signal generator which determines phases of driving signals based on a reference code and supplies the driving signals to the sensing electrodes, wherein the driving signals are sine waves; and
a touch processor which receives sensing signals according to the driving signals from the sensing electrodes and determines a touch position based on the sensing signals and the reference code,
wherein the driving signal generator controls the phases of the driving signals by updating the reference code at a predetermined time point, and
wherein the time point is determined so that a maximum phase delay of the driving signals to the time point is less than $\pi/4$.

15. The display device of claim 14, further comprising:
a display driver which controls driving of the pixels.

16. The display device of claim 15, wherein the driving signal generator supplies the driving signals in parallel to driving electrodes included in a first group of the driving electrodes during a first driving period.

17. The display device of claim 16, wherein the reference code includes a matrix including 1 or −1 as a value thereof, and
the value 1 and the value −1 represent sine waves having opposite polarities.

18. The display device of claim 17, wherein the driving signal generator comprises:
a sine wave generator which generates sine wave signals; and
a code generator which outputs a first phase or an inverse phase of the first phase of the sine wave signals supplied from the sine wave generator in response to the reference code as the driving signals.

19. A touch sensor, comprising:
a touch sensing area including a plurality of sensing electrodes and a plurality of driving electrodes;
a driving signal generator configured to provide the driving electrodes with a plurality of driving signals, wherein phases and waveforms of the driving signals are based on a reference code; and
a touch processor configured to detect a touch position based on capacitance values formed at intersections of the sensing electrodes and the driving electrodes,
wherein the driving signal generator is further configured to update the reference code at predetermined time points, and
wherein the time points are determined so that a maximum phase delay of the driving signals between time points is less than $\pi/4$.

20. The touch sensor of claim 19, wherein the driving signals are sinusoidal signals.

21. The touch sensor of claim 20, wherein the reference code is updated such that the driving signals satisfy orthogonality during consecutive driving periods.

22. The touch sensor of claim 20, wherein the driving signal generator comprises:
a sine wave generator configured to generate a sine wave signal;
a code generator configured to output the sine wave signal having a first phase or a second phase as one of the driving signals in response to the reference code; and
a storage configured to store the reference code.

23. The touch sensor of claim 20, wherein the first and second phases are opposite.

* * * * *